United States Patent
Wu

(10) Patent No.: US 12,167,488 B2
(45) Date of Patent: Dec. 10, 2024

(54) COMMUNICATION OF SEGMENTED RADIO RESOURCE CONTROL MESSAGES

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 266 days.

(21) Appl. No.: 17/627,775

(22) PCT Filed: Jul. 9, 2020

(86) PCT No.: PCT/US2020/041324
§ 371 (c)(1),
(2) Date: Jan. 17, 2022

(87) PCT Pub. No.: WO2021/011281
PCT Pub. Date: Jan. 21, 2021

(65) Prior Publication Data
US 2022/0322483 A1  Oct. 6, 2022

Related U.S. Application Data

(60) Provisional application No. 62/882,923, filed on Aug. 5, 2019, provisional application No. 62/879,713, filed
(Continued)

(51) Int. Cl.
*H04W 76/18* (2018.01)
*H04L 5/00* (2006.01)
(Continued)

(52) U.S. Cl.
CPC ........... *H04W 76/18* (2018.02); *H04L 5/0048* (2013.01); *H04L 5/0053* (2013.01); *H04W 24/08* (2013.01);
(Continued)

(58) Field of Classification Search
CPC ... H04W 76/18; H04W 24/08; H04W 28/065; H04W 36/08; H04W 76/19; H04W 76/20;
(Continued)

(56) References Cited

U.S. PATENT DOCUMENTS 11,330,661 B2 *  5/2022  Kim .................... H04L 69/166
2007/0291695 A1  12/2007  Sammour et al.
(Continued)

FOREIGN PATENT DOCUMENTS

| KR | 2020-0074725 A | 6/2020 |
| KR | 2020-0128977 A | 11/2020 |
| WO | WO-2021/012168 A1 | 1/2021 |

OTHER PUBLICATIONS

International Search Report and Written Opinion for Application No. PCT/US2020/041334, dated Sep. 7, 2020.
(Continued)

*Primary Examiner* — Ayaz R Sheikh
*Assistant Examiner* — Tarell A Hampton
(74) *Attorney, Agent, or Firm* — MARSHALL, GERSTEIN & BORUN LLP

(57) ABSTRACT

A method, in a user device configured to communicate with a base station, for managing communication of a segmented radio resource control (RRC) message that includes N segments includes transmitting (222) a first M segments of the segmented RRC message to the base station, M being an integer greater than zero and less than N, detecting (230 or 330), by processing hardware of the user device and before transmitting an (M+1)-th segment of the segmented RRC message, an intervening event, that triggers an RRC procedure, and, after detecting the intervening event, transmitting (260) the (M+1)-th segment through an N-th segment of the segmented RRC message to the base station before the RRC procedure has completed.

18 Claims, 17 Drawing Sheets

Related U.S. Application Data on Jul. 29, 2019, provisional application No. 62/875,041, filed on Jul. 17, 2019.

(51) Int. Cl.

| | | |
|---|---|---|
| *H04W 24/08* | (2009.01) | |
| *H04W 28/06* | (2009.01) | |
| *H04W 76/19* | (2018.01) | |
| *H04W 76/20* | (2018.01) | |
| *H04W 76/27* | (2018.01) | |

(52) U.S. Cl.
CPC ......... *H04W 28/065* (2013.01); *H04W 76/19* (2018.02); *H04W 76/20* (2018.02); *H04W 76/27* (2018.02)

(58) Field of Classification Search
CPC .... H04W 76/27; H04L 5/0048; H04L 5/0053; H04L 2001/0097; H04L 1/1635; H04L 5/0055
See application file for complete search history.

(56) References Cited

U.S. PATENT DOCUMENTS

| | | | |
|---|---|---|---|
| 2008/0287105 A1* | 11/2008 | Wu ..................... | H04W 12/037 455/412.1 |
| 2009/0103445 A1 | 4/2009 | Sammour et al. | |
| 2010/0034171 A1* | 2/2010 | Pelletier ............. | H04W 36/0058 370/331 |
| 2011/0032889 A1* | 2/2011 | Lee ..................... | H04W 74/006 370/329 |
| 2012/0230219 A1 | 9/2012 | Pettersson et al. | |
| 2012/0300748 A1 | 11/2012 | Lindstrom et al. | |
| 2014/0056243 A1* | 2/2014 | Pelletier .............. | H04W 52/365 370/329 |
| 2014/0293908 A1 | 10/2014 | Kumar et al. | |
| 2015/0289157 A1* | 10/2015 | Lundqvist ............ | H04W 24/10 455/419 |
| 2016/0029275 A1 | 1/2016 | Guo et al. | |
| 2016/0135097 A1 | 5/2016 | Jinnu et al. | |
| 2016/0285592 A1* | 9/2016 | Hsu ....................... | H04L 1/189 |
| 2016/0285716 A1* | 9/2016 | Pelletier .............. | H04L 43/0811 |
| 2017/0294977 A1 | 10/2017 | Uchino et al. | |
| 2018/0123739 A1 | 5/2018 | Yi et al. | |
| 2018/0317137 A1 | 11/2018 | Loehr et al. | |
| 2018/0324617 A1* | 11/2018 | Schmidt ............... | H04W 24/08 |
| 2019/0053113 A1 | 2/2019 | Wu | |
| 2019/0104432 A1 | 4/2019 | Dhanapal et al. | |
| 2019/0150217 A1 | 5/2019 | Kim | |
| 2019/0200212 A1 | 6/2019 | Quan et al. | |
| 2019/0289661 A1* | 9/2019 | Chen ..................... | H04W 24/10 |
| 2019/0394807 A1* | 12/2019 | Xiao ..................... | H04W 72/56 |
| 2020/0107223 A1 | 4/2020 | Liu et al. | |
| 2020/0196376 A1 | 6/2020 | Kim et al. | |
| 2021/0153022 A1* | 5/2021 | Ohlsson .............. | H04W 12/037 |
| 2021/0211865 A1* | 7/2021 | Li .......................... | H04L 69/04 |
| 2022/0191962 A1* | 6/2022 | Di Girolamo ........ | H04L 5/0053 |
| 2022/0217583 A1* | 7/2022 | Jin ........................ | H04W 8/24 |

OTHER PUBLICATIONS

International Search Report and Written Opinion for Application No. PCT/US2020/041318, dated Sep. 9, 2020.
Huawei et al., "Segmentation of UE Radio Capability Information," 3GPP Draft (2018).
International Search Report and Written Opinion for Application No. PCT/US2020/041324, dated Sep. 23, 2020.
Samsung, "SRB Type for the Segmented UECapabilityInformation," 3GPP Draft (2019).
Apple, "Segmentation of UE Capability," 3GPP Draft (2019).
Huawei et al., "Signalling of Supportings Segmentation of UE Capability," 3GPP Draft (2019).
3GPP, "3rd Generation Partnership Project: Technical Specification Group Radio Access Network; NR and Evolved Universal Terrestrial Radio Access (E-UTRA); Study on Optimizations of UE Radio Capability Signalling: Release 16," (2019).
International Preliminary Report on Patentability for Application No. PCT/US2020/041324, dated Oct. 5, 2021.
International Preliminary Report on Patentability for Application No. PCT/US2020/041334, dated Oct. 5, 2021.
3GPP TS 38.331 V15.5.1 (Apr. 2019), 3rd Generation Partnership Project; Technical Specification Group Radio Access Network; NR; Radio Resource Control (RRC) Protocol Specification (Release 15), 491 pages.
3GPP TR 37.873 V0.1.0 (Mar. 2019), 3rd Generation Partnership Project; Technical Specification Group Radio Access Network; Study on Optimizations of UE Radio Capability Signalling; NR / Evolved Universal Terrestrial Radio Access Network (E-UTRAN) aspects (Release 16), 18 pages.
3GPP TS 38.300 V16.1.0 (Mar. 2020), 3rd Generation Partnership Project; Technical Specification Group Radio Access Network; NR; NR and NG-RAN Overall Description; Stage 2 (Release 16), 133 pages.
3GPP TS 38.331 V15.6.0 (Jun. 2019), 3rd Generation Partnership Project; Technical Specification Group Radio Access Network; NR; Radio Resource Control (RRC) Protocol (Release 15), 519 pages.
3GPP TSG-RAN2 Meeting#105, R2-1901292, Resubmission of R2-1817648, Athens Greece, Feb. 25-Mar. 1, 2019, "Segmentation of UE Radio Capability Information", 3 pages.
3GPP TSG-RAN2 Meeting#106, R2-1907570, Revision of R2-1904814, Reno Nevada, USA, May 13-17, 2019, "Signalling of Supporting Segmentation of UE Capability", 3 pages.
3GPP TSG-RAN2 WG2 Meeting#106, R2-1907721, Reno, Nevada, USA, May 13-17, 2019, "SRB Type for the Segmentated UE Capability Information", 3 pages.
First Examination Report for India Application No. 202247007030, dated May 31, 2022.
Office Action for European Application No. 20745457.0, dated Apr. 2, 2024.

* cited by examiner

COMMUNICATION OF SEGMENTED RADIO RESOURCE CONTROL MESSAGES

FIELD OF THE DISCLOSURE

This disclosure relates to radio resource control messaging and, more particularly, to wireless communication systems that communicate radio resource control messages that are divided into multiple segments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication networks, user devices (commonly referred to using the acronym "UE" for "user equipment") can divide certain radio resource control (RRC) messages into multiple segments, and sequentially transmit those segments to a base station of a radio access network (RAN). According to one proposal for the 3rd Generation Partnership Project (3GPP) specification for fifth-generation (5G) radio access ("NR") networks, for example, a user device can divide an RRC protocol data unit (PDU) containing a UE capability information message (and thus, the message itself) into multiple segments, and sequentially transmit those segments to a base station via a radio link. The UE capability transfer procedure is described in more detail in 3GPP TS 38.331 v15.5.1.

In some instances, however, an intervening event might trigger another RRC procedure before the user device has transmitted all segments of the segmented RRC message. For example, the intervening event might be physical layer (PHY) measurements indicating poor radio link quality (triggering a measurement report), communication of a particular inter-protocol layer message from the non-access stratum (NAS) layer to the RRC layer (triggering transmission of a NAS message over the radio link), or criteria for reconfiguration of the user device being satisfied (triggering a user device reconfiguration procedure).

Intervening events such as these can cause various problems, depending on the system design (e.g., the configuration of the user device and/or base station). For example, the intervening event can cause an RRC procedure associated with the segmented RRC message to fail (e.g., a failed UE capability transfer procedure), cause the RRC procedure triggered by the intervening event to fail (e.g., a failed user device reconfiguration procedure, or a failed transmission of a NAS message over the radio link), and/or cause other problems due to interference with the RRC procedure triggered by the intervening event (e.g., radio link failure or suboptimal system performance if a timely measurement report or user device reconfiguration did not occur).

SUMMARY

Techniques of this disclosure concern wireless communication systems in which, while the user device is transmitting segments of an RRC message to a base station for purposes of a first RRC procedure, an intervening event triggers a second, different RRC procedure (e.g., a transmission of a measurement report or NAS message over the radio link, reconfiguration of the user device, etc.). When such intervening events occur, the disclosed techniques increase the probability that the user device and/or the base station will successfully complete both the RRC procedure associated with the segmented RRC message (e.g., a UE capability transfer procedure) and the RRC procedure triggered by the intervening event, and/or decrease the probability that delayed completion of one of those RRC procedures will cause related problems (e.g., radio link failure or suboptimal system performance).

In some implementations and scenarios, after transmitting to the base station the first M segments of an RRC message that includes N segments (0<M<N), the user device detects the intervening event. Thereafter, the user device either executes the RRC procedure triggered by the intervening event before transmitting the remaining N−M segments, or suspends the RRC procedure triggered by the intervening event until after transmitting the remaining N−M segments. As one example, the intervening event may be, at the user device, a NAS layer sending a particular inter-protocol layer message to the RRC layer, and the triggered RRC procedure may be the transmission of a NAS message to the base station (e.g., in an RRC PDU). As another example, the intervening event may be one or more PHY measurements satisfying one or more criteria, in which case the triggered RRC procedure may be the transmission of a measurement report to the base station. In an alternative implementation, after the base station sends the user device an initial RRC message (e.g., a UECapabilityEnquiry message) that triggers transmission of the segmented RRC message (e.g., a UECapabilityInformation message), the initial RRC message also causes the user device to stop collecting PHY measurements. Thus, in this latter implementation, measurement reporting is not possible throughout the transmission of the segmented RRC message, and cannot interrupt the transmission.

In other implementations, the base station (rather than the user device) detects the intervening event, after receiving from the user device the first M segments of an RRC message that includes N segments (0<M<N). Thereafter, the base station causes the RRC procedure triggered by the intervening event to occur either before or after the base station receives the remaining N−M segments from the user device. As one example, the intervening event may be, at the base station, receiving a NAS layer message from a core network, and the triggered RRC procedure may be the transmission of a NAS message to the user device (e.g., in an RRC PDU). As another example, the intervening event may be one or more criteria for reconfiguring the user device being satisfied, in which case the triggered RRC procedure is the reconfiguring of the user device (e.g., transmitting an RRCReconfiguration message to the user device).

One example implementation of these techniques is a method, in a user device configured to communicate with a base station, for managing communication of a segmented RRC message that includes N segments. The method includes transmitting a first M segments of the segmented RRC message to the first base station (M being an integer greater than zero and less than N), detecting, by processing hardware of the user device and before transmitting an (M+1)-th segment of the segmented RRC message, an intervening event that triggers an RRC procedure, and, after detecting the intervening event, executing a first RRC procedure before a second RRC procedure has completed. The first RRC procedure and the second RRC procedure are different ones of (i) transmitting the (M+1)-th segment through an N-th segment of the segmented RRC message to the base station, and (ii) the RRC procedure.

Another example implementation of these techniques is a method, in a base station configured to communicate with a user device, for managing communication of a segmented RRC message that includes N segments. The method includes receiving a first M segments of the segmented RRC message from the user device (M being an integer greater than zero and less than N), detecting, by processing hardware of the base station and before receiving an (M+1)-th segment of the segmented RRC message, an intervening event that triggers an RRC procedure, and after detecting the intervening event, executing at least a portion of a first RRC procedure before a second RRC procedure has completed. The first RRC procedure and the second RRC procedure are different ones of (i) receiving the (M+1)-th segment through an N-th segment of the segmented RRC message from the user device, and (ii) the RRC procedure.

Another example implementation of these techniques is a method, in a user device configured to communicate with a base station via a radio link, for managing communication of a segmented RRC message that includes N segments. The method includes collecting one or more physical layer (PHY) measurements associated with the radio link, and receiving an RRC message from the base station via the radio link. The method also includes, in response to receiving the RRC message, transmitting the N segments of the segmented RRC message to the base station via the radio link, and suspending the collecting of the PHY measurements until transmitting the N segments is complete. The method further includes, after transmitting the N segments, resuming the collecting of the PHY measurements.

DETAILED DESCRIPTION OF THE DRAWINGS

Generally speaking, the techniques of this disclosure allow a user device (UE) to successfully communicate all segments of a segmented RRC message to a base station despite an intervening event triggering another RRC procedure, without retransmitting segments unnecessarily or causing failure of the triggered RRC procedure, and/or without causing related problems (e.g., radio link failure or suboptimal system performance) due to delay of an RRC procedure. These techniques are discussed below with example reference to a 5G radio access ("NW") network and a 5G core network (5GC). However, the techniques of this disclosure can apply to other radio access and/or core network technologies.

Figure 1:
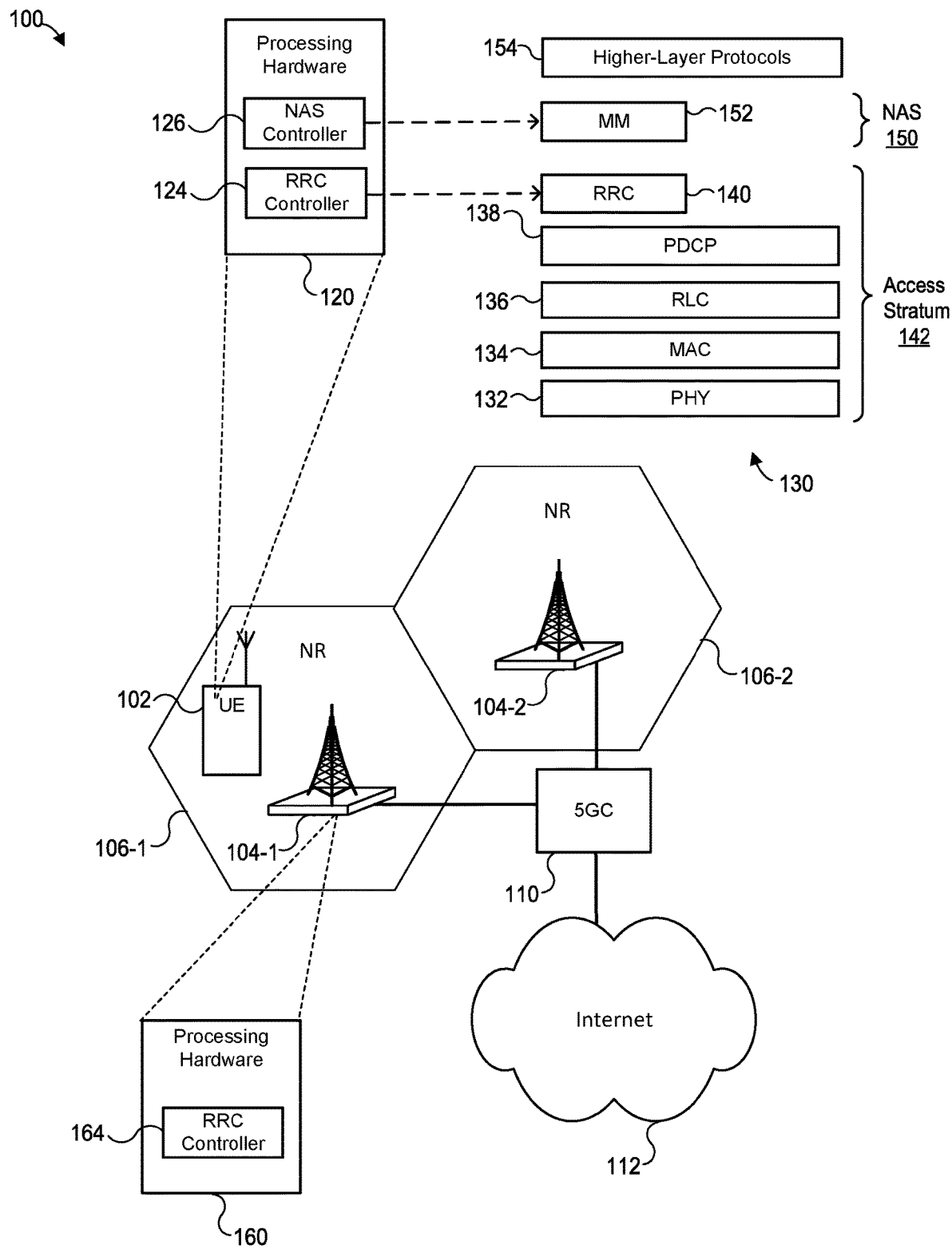
FIG. 1 is a block diagram of an example wireless communication network in which a user device and base station of this disclosure can communicate segmented RRC messages.

Referring first to FIG. 1, a UE 102 can operate in an example wireless communication network 100. The wireless communication network 100 includes base stations 104-1 and 104-2, associated with respective cells 106-1 and 106-2. While FIG. 1 depicts each of base stations 104-1 and 104-2 as serving only one cell, it is understood that the base station 104-1 and/or the base station 104-2 may also cover one or more additional cells not shown in FIG. 1. In general, the wireless communication network 100 can include any number of base stations, and each of the base stations can cover one, two, three, or any other suitable number of cells.

The base stations 104-1 and 104-2 may each operate as a 5G Node B (gNB), for example, and are referred to as such in the example messaging diagrams of FIGS. 2 through 14 (discussed below). As seen in FIG. 1, the base station 104-1 and the base station 104-2 are both connected to a 5GC 110, which is in turn connected to the Internet 112. In various alternative implementations and/or scenarios, the wireless communication network 100 does not include the base station 104-2 and/or the cell 106-2, or the base station 104-2 is a next-generation evolved Node B (ng-eNB) and the cell 106-2 is an Evolved Universal Terrestrial Radio Access (EUTRA) cell, etc.

The UE 102 can support an NR air interface, and exchange messages with the base station 104-1 when operating in the cell 106-1 or the base station 104-2 when operating in the cell 106-2. In other implementations, the UE 102 also can support a EUTRA air interface, and exchange messages with the base station 104-1 over 5G NR when operating in the cell 106-1, and with the base station 104-2 over EUTRA when operating in the cell 106-2. As discussed below, the UE 102 can be any suitable device capable of wireless communications.

The UE 102 is equipped with processing hardware 120, which can include one or more general-purpose processors (e.g., CPUs) and a non-transitory computer-readable memory storing instructions that the one or more general-purpose processors can execute. Additionally or alternatively, the processing hardware 120 can include special-purpose processing units, such as a wireless communication chipset, for example. The processing hardware 120 includes an RRC controller 124 and a NAS controller 126. While not shown in FIG. 1, the processing hardware 120 may also include a controller for each of a number of other layers, such as a packet data convergence protocol (PDCP) controller, a medium access control (MAC) controller, and so on.

The RRC controller 124 and NAS controller 126 are responsible for inbound messaging, outbound messaging, and internal procedures at the corresponding layers of a wireless communication protocol stack 130, discussed further below. In addition to supporting messaging external to the UE 102, the controllers 124 and 126 (and possibly other layer-specific controllers in the UE 102) can send internal, "inter-protocol layer" (IPL) messages to each other and/or other layers. As used herein, the terms "communicate" and "send" include reference to the exchange of information between layers of a wireless communication protocol stack, with the communicating/sending layer being the information source and the receiving layer being the information destination.

The RRC controller 124 and the NAS controller 126 can be implemented using any suitable combination of hardware, software, and/or firmware. In one example implementation, the RRC controller 124 and the NAS controller 126 each comprise a set of instructions that defines respective components of the operating system of the UE 102, and one or more CPUs of the processing hardware 120 execute these instructions to perform the respective RRC or NAS functions. In another implementation, the RRC controller 124 and/or the NAS controller 126 is/are implemented using firmware as a part of a wireless communication chipset.

The protocol stack 130, illustrated in a simplified manner in FIG. 1, includes, among other possible layers, a physical layer 132 (commonly abbreviated as the PHY layer), a medium access control layer 134 (commonly abbreviated as the MAC layer), a radio link control (RLC) layer 136, a PDCP layer 138, and an RRC layer 140, as parts of an access stratum 142. NAS layer(s) 150 of the protocol stack 130 may include, among other possible layers, one or more mobility management (MM) layers 152 for handling registration, attachment, or tracking area update procedures. While FIG. 1 depicts the NAS controller 126 as corresponding specifically to the MM layer(s) 152, it is understood that in other implementations the NAS controller 126 may also, or instead, correspond to one or more other (non-MM) layers of the NAS layer(s) 150. As further illustrated in FIG. 1, the protocol stack 130 also supports higher-layer protocols 154 for various services and applications. For example, the higher-layer protocols 154 may include Internet Protocol (IP), Transmission Control Protocol (TCP), and User Datagram Protocol (UDP).

The RRC layer 140 packages and interprets RRC PDUs, which may contain any of various types of RRC messages associated with different RRC procedures (e.g., connection establishment or reestablishment procedures, a UE capability transfer procedure, a measurement reporting procedure, etc.). The various layers 132, 134, 136, 138, 140, 152 and 154 may be ordered as shown in FIG. 1. It is understood, however, that in some implementations and/or situations, one or more of the depicted layers may operate in a manner that does not strictly conform to the ordering shown in FIG. 1.

On the UE 102 side, the RRC layer 140 (i.e., RRC controller 124) can divide one or more types of RRC messages into multiple segments, and transmit the segments sequentially. In some implementations, the RRC controller 124 accomplishes this by including a particular RRC message in an RRC PDU, and then segmenting the RRC PDU such that each RRC PDU segment includes a corresponding RRC message segment. In this disclosure, reference to the transmission or reception of an RRC message segment may indicate (in some implementations) that the RRC message segment is transmitted or received, respectively, within a segment of an RRC PDU. As one example, if the UE 102 receives a UECapabilityEnquiry message from the base station 104-1, the RRC controller 124 may respond by generating a UECapabilityInformation message, packaging the UECapabilityInformation message in an RRC PDU, dividing the RRC PDU into multiple segments, and then causing the UE 102 to sequentially transmit the RRC PDU segments to the base station 104-1.

The base station 104-1 is equipped with processing hardware 160, which can include one or more general-purpose processors (e.g., CPUs) and a non-transitory computer-readable memory storing instructions that the one or more general-purpose processors can execute. Additionally or alternatively, the processing hardware 160 can include special-purpose processing units, such as a wireless communication chipset, for example. Similar to the processing hardware 120 of the UE 102, the processing hardware 160 includes an RRC controller 164. While not shown in FIG. 1, the processing hardware 160 may also include a controller for each of a number of other layers, such as a PDCP and/or MAC controller.

Whereas the RRC controller 124 and the NAS controller 126 of the UE 102 implement functionality of the RRC layer 140 and one or more NAS layers 150 (respectively) on the user device 102 side, the RRC controller 164 implements functionality of the RRC layer 140 on the base station 104-1 side. As one example, the RRC controller 124 may generate a measurement report message and cause the UE 102 to transmit the measurement report message to the base station 104-1, while the RRC controller 164 may interpret the measurement report message when received at the base station 104-1. As another example, the NAS controller 126 may generate a NAS message (e.g., a registration request message) that the RRC controller 124 packages in an RRC PDU for transmission to the base station 104-1, while the base station 104-1 may forward the NAS message to the 5GC 110 (e.g., to an Access and Mobility Management Function (AMF)) after the RRC controller 164 extracts the NAS message from the RRC PDU.

The RRC controller 164 can be implemented using any suitable combination of hardware, software, and/or firmware. In one example implementation, the RRC controller 164 comprises a set of instructions that defines respective components of the operating system of the base station 104-1, and one or more CPUs of the processing hardware 160 execute these instructions to perform the RRC functions. In another implementation, the RRC controller 164 is implemented using firmware as a part of a wireless communication chipset. In some implementations, the base station 104-2 includes processing hardware similar to the processing hardware 160 of the base station 104-1. In other implementations, the base station 104-2 may be co-located with the base station 104-1 and share some of the processing hardware 160 of the base station 104-1.

On the base station 104-1 side, the RRC layer 140 (i.e., RRC controller 164) can process one or more types of RRC messages that the base station 104-1 receives as multiple, sequential segments. As one example, if the base station 104-1 receives a sequence of segments of a UECapabilityInformation message from the UE 102 (e.g., within a sequence of RRC PDU segments), the RRC controller 164 can successfully interpret the segmented message (i.e., determine the capabilities of the UE 102 as indicated in the entire UECapabilityInformation message).

For simplicity, FIG. 1 does not depict various components of the UE 102 and the base stations 104-1, 104-2. In addition to the layer-specific controllers mentioned above, for example, the UE 102 and the base stations 104-1, 104-2 include respective transceivers, which comprise various hardware, firmware, and software components that are configured to transmit and receive wireless signals according to the NR air interface. The processing hardware 120 and the processing hardware 160 (and similar processing hardware in the base station 104-2) can send commands and exchange information with the respective transceivers as needed to perform various connection establishment procedures, perform various RRC or NAS procedures, or communicate with other network elements, etc.

Example message sequences and methods that the UE 102, base station 104-1, and/or 5GC 110 can implement and execute will now be discussed with reference to FIGS. 2 through 14. The UE 102, base station 104-1 and/or 5GC 110 can implement at least some of the acts described below in software, firmware, hardware, or any suitable combination of software, firmware, and hardware. Although FIGS. 2 through 14 are discussed below with reference to the components depicted in FIG. 1 and a 5G system, in general any suitable components or wireless communication network may be used.

Figure 2:
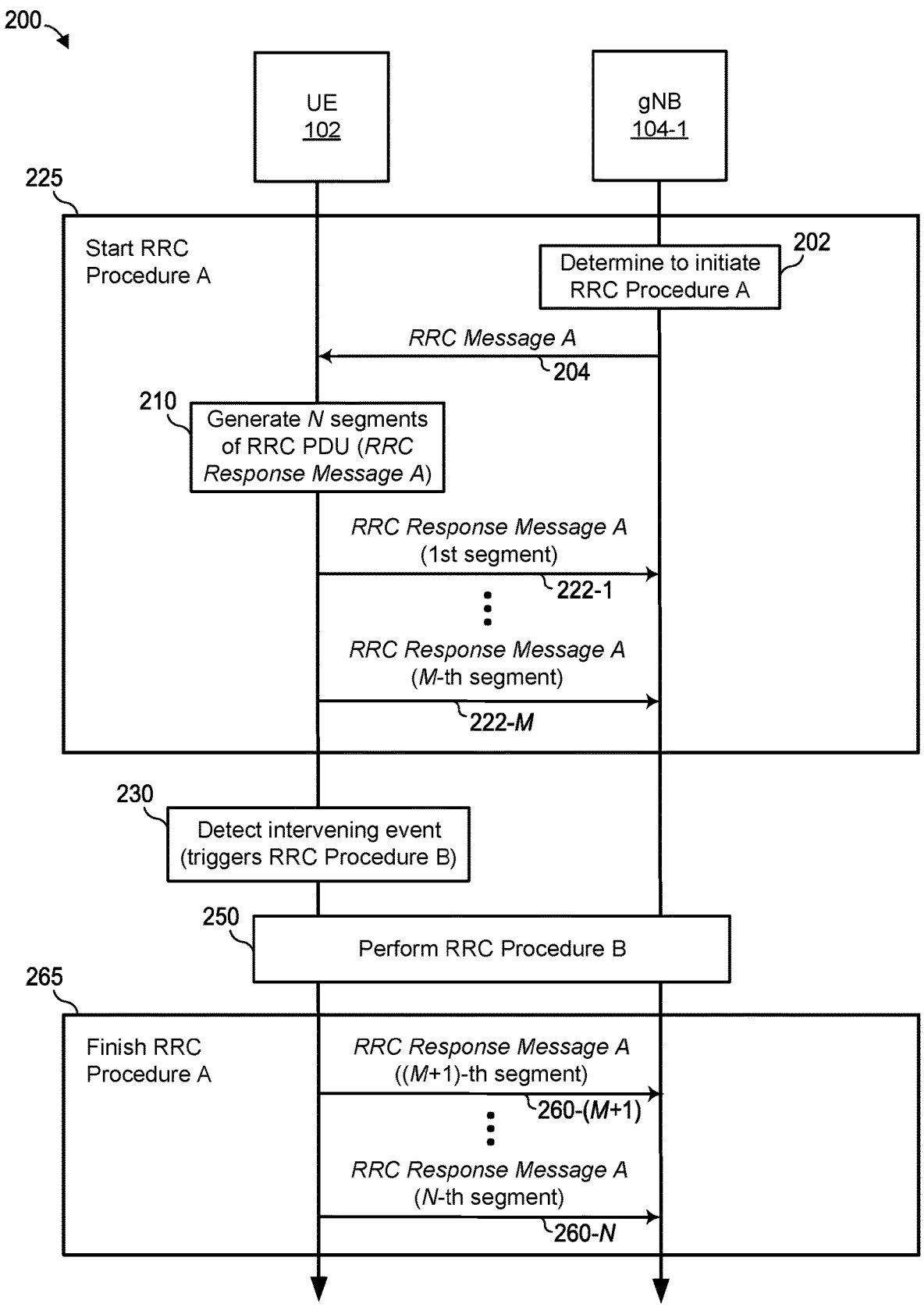
FIGS. 2 through 14 depict various messaging diagrams related to the transmission of a segmented RRC message in the wireless communication network of FIG. 1.
Figure 3:
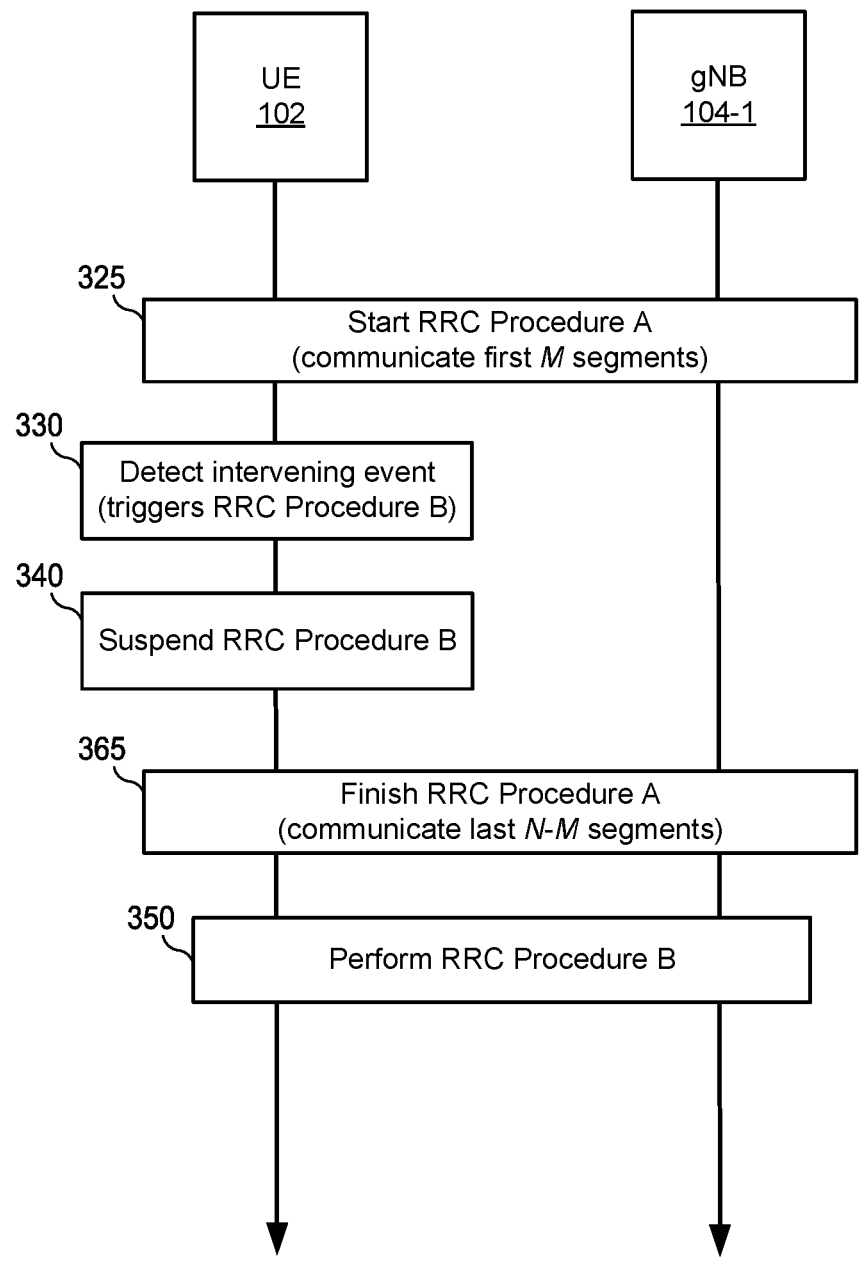

FIGS. 2 through 7 depict implementations and scenarios in which the UE 102 detects an intervening event while transmitting a segmented RRC message. FIG. 2 depicts the general case of a first technique in which the UE 102 does not transmit the remaining segments until after completion of an RRC procedure triggered by the intervening event, while FIG. 3 depicts the general case of a second technique in which the UE 102 suspends the triggered RRC procedure until after the UE 102 finishes transmitting the remaining segments. FIGS. 4 through 7 depict specific example implementations and/or scenarios corresponding to the technique of FIG. 2 or the technique of FIG. 3. FIG. 8 depicts an alternative technique in which the UE 102 ensures that a particular intervening event (i.e., a measurement report trigger) does not occur during transmission of the segmented RRC message, and/or cannot interrupt transmission of the segmented RRC message.

Referring first to FIG. 2, a messaging diagram 200 depicts example messages that the UE 102 and the base station 104-1 of FIG. 1 may exchange, along with associated operations, according to some implementations and scenarios. As noted above, FIG. 2 depicts the general case of a first technique in which the UE 102 transmits the remaining segments after completion of an RRC procedure triggered by the intervening event. In the messaging diagram 200, the RRC controller 124 of the UE 102 may perform (or trigger, e.g., in the case of message transmission) all operations of the UE 102. Similarly, the RRC controller 164 may perform or trigger the operations of the base station 104-1.

At the start of the messaging diagram 200, the UE 102 and the base station 104-1 have already established an RRC connection. As seen in FIG. 2, the base station 104-1 determines 202 to initiate a particular RRC procedure ("RRC Procedure A"), and then transmits 204 an RRC message ("RRC Message A") to the UE 102. RRC Procedure A may be a UE capability transfer procedure as defined in 3GPP TS 38.331 v15.5.1, and RRC Message A may be a UECapabilityEnquiry message, for example.

In response to receiving and processing RRC Message A, the UE 102 generates 210 all N segments of an RRC PDU containing an RRC response message ("RRC Response Message A"), where N is an integer greater than one (e.g., two, four, 10, 16, etc.). If RRC Procedure A is a UE capability transfer procedure, for example, then RRC Response Message A may be a UECapabilityInformation message that specifies various capabilities of the UE 102 (e.g., radio access technologies supported by the UE 102, etc.). As one example, generating 210 the N segments may include generating the RRC Response Message A, including the RRC Response Message A in an RRC PDU, and then dividing the RRC PDU into the N segments.

The UE 102 then sequentially transmits (222-1 through 222-M) the first M of the N segments to the base station 104-1, where M is an integer greater than zero and less than N. In other implementations, the UE 102 does not generate 210 all N segments before transmitting 222-1 the first segment. For example, the UE 102 may instead generate 210 each segment just prior to transmitting 222 that segment, such that the generating 210 and transmitting 222 operations are interleaved. In still other implementations, the UE 102 may generate 210 the N segments before receiving RRC Message A, and store the N segments for later transmission in response to receiving RRC Message A. The determining 202, transmitting 204, generating 210, and transmitting 222-1 through 222-M are collectively referred to herein as starting 225 RRC Procedure A. In some implementations (not reflected in FIG. 2), starting 225 RRC Procedure A does not include any operations (e.g., transmissions) by base station 104-1.

After the UE 102 transmits 222-M the M-th segment, the UE 102 detects 230 an intervening event. As will be seen from the examples discussed below with reference to FIGS. 4 through 7, the intervening event may be any event that triggers a particular RRC procedure (generally referred to in FIG. 2 as "RRC Procedure B"), and the triggered RRC procedure may be any procedure that requires the UE 102 to transmit at least one RRC message to the base station 104-1 via the radio link. For example, the intervening event may be one or more criteria/conditions being satisfied (e.g., a radio link quality metric falling below a threshold level), a NAS message being ready for transmission to the base station 104-1 via the radio link (e.g., the NAS controller 126 sending an IPL message including the NAS message to the RRC controller 124), or another type of event.

In the techniques of this disclosure, after the UE 102 detects 230 the intervening event, the UE 102 follows one of two courses of action, depending on the implementation. In one implementation, reflected in FIG. 2 (as well as FIGS. 4 and 6), the UE 102 executes the triggered RRC Procedure B before transmitting the remaining segments (i.e., the last N−M segments). In other implementations, reflected in FIG. 3 (as well as FIGS. 5 and 7), the UE 102 instead suspends the triggered RRC Procedure B until after transmission of the remaining segments.

In the implementation of FIG. 2, after the UE 102 detects 230 the intervening event, the UE 102 (and in some implementations, also the base station 104-1) performs 250 RRC Procedure B (e.g., by communicating one or more RRC messages). In some implementations, performing 250 RRC Procedure B includes the UE 102 transmitting at least one RRC message to the base station 104-1.

After the UE 102 (and possibly the base station 104-1) performs 250 RRC Procedure B, the UE 102 sequentially transmits (260-(M+1) through 260-N) the remaining ((M+1)-th through N-th) segments to the base station 104-1. The transmitting 260-(M+1) through 260-N is collectively referred to herein as finishing 265 RRC Procedure A. In some implementations (not reflected in FIG. 2), finishing 265 RRC Procedure A also includes one or more operations (e.g., RRC message transmissions to UE 102) by base station 104-1. After the base station 104-1 receives all N segments, the base station 104-1 can assemble all of the segments into the complete RRC PDU. In one implementation, the UE 102 may not be able to immediately perform 250 RRC Procedure B in response to the detection 230, due to processing time in preparing for RRC Procedure B, generating the at least one RRC message, and/or interrupting RRC Procedure A. During the processing time, the UE 102 continues to sequentially transmit (260-(M+1) through 260-(M+L)) the (M+1)-th through (M+L)-th segments to the base station 104-1, where 0<L<(N−M). After the processing time, the UE 102 performs 250 RRC procedure B. After the UE 102 finishes performing 250 RRC Procedure B, the UE 102 sequentially transmits (260-(M+L+1) through 260-N) the (M+L+1)-th through N-th segments to the base station 104-1.

As used herein, the term "RRC procedure" may refer to a complete RRC procedure as defined by a specification (e.g., a UE capability transfer procedure as defined by the 5G specification), or may refer to any subset of such a procedure, for example, so long as the procedure or procedure subset includes communication of at least one RRC message between a user device and base station (e.g., UE 102 and base station 104-1) via a radio link. Thus, for example, transmission of the last N−M segments of RRC Response Message A may be referred to as an RRC procedure by itself, despite being only a subset of RRC Procedure A.

In the implementation of FIG. 2, the base station 104-1 is configured to successfully receive and process segments of RRC Response Message A irrespective of whether transmission of those segments is temporarily interrupted as shown in messaging diagram 200. Thus, the UE 102 and the base station 104-1 can successfully complete RRC Procedure A. Moreover, the UE 102 (and possibly the base station 104-1) can perform 250 RRC Procedure B successfully, and without substantial adverse effects (e.g., radio link failure or poor system performance). This is because the UE 102 does not (at least in some implementations) alter the timing of RRC Procedure B relative to the triggering event, irrespective of whether RRC Procedure A is currently in progress. If RRC Procedure B is a measurement reporting procedure (e.g., as discussed below in connection with FIG. 4), for example, timely completion of the procedure may prevent radio link failure. For instance, the measurement report may help to maintain communication between the UE 102 and a RAN that includes base station 104-1, by triggering a handover procedure to base station 104-2 when the signal quality on the radio link between UE 102 and base station 104-1 degrades suddenly and severely.

Referring next to FIG. 3, a messaging diagram 300 depicts example messages that the UE 102 and the base station 104-1 of FIG. 1 may exchange, along with associated operations, according to other implementations and scenarios. As noted above, FIG. 3 depicts the general case of a second technique in which the UE 102 suspends the RRC procedure triggered by the intervening event until after transmission of the remaining segments. In the messaging diagram 300, the RRC controller 124 of the UE 102 may perform (or trigger, e.g., in the case of message transmission) all operations of the UE 102. Similarly, the RRC controller 164 may perform or trigger the operations of the base station 104-1.

As seen in FIG. 3, the UE 102 (and possibly also the base station 104-1) starts 325 RRC Procedure A, which includes the UE 102 transmitting the first M segments to the base station 104-1. Starting 325 RRC Procedure A in messaging diagram 300 may be the same as, or similar to, starting 225 RRC Procedure A in messaging diagram 200.

Next, the UE 102 detects 330 an intervening event that triggers RRC Procedure B. Detecting 330 the intervening event in messaging diagram 300 may be the same as, or similar to, detecting 230 the intervening event in messaging diagram 200. As discussed above with reference to FIG. 2, for example, the intervening event may be any event that triggers RRC Procedure B, and RRC Procedure B may be any procedure that requires the UE 102 to transmit at least one RRC message to the base station 104-1 via the radio link.

After the UE 102 detects 330 the intervening event, the UE 102 suspends 340 RRC Procedure B. That is, the UE 102 does not perform or initiate RRC Procedure B at the time that the UE 102 would normally (i.e., but for the suspension 340) perform or initiate RRC Procedure B in response to detecting 330 the triggering event. Instead, the UE 102 (and possibly also the base station 104-1) first finishes 365 RRC Procedure A, which includes transmitting the last N−M segments to the base station 104-1, and then performs 350 RRC Procedure B. Finishing 365 RRC Procedure A and performing 350 RRC Procedure B in messaging diagram 300 may be the same as, or similar to, finishing 265 RRC Procedure A and performing 250 RRC Procedure B, respectively, in messaging diagram 200, but in reverse order.

In the implementation of FIG. 3, the UE 102 and the base station 104-1 can successfully complete RRC Procedure A because, at least in some implementations, there is no intervening RRC message (of another RRC procedure) while the UE 102 transmits the N segments to the base station 104-1. Moreover, the delay in performing 350 RRC Procedure B may be slight enough to avoid substantial adverse effects (e.g., radio link failure or poor system performance). The implementation of FIG. 3 may be particularly useful in systems where base stations such as base station 104-1 can only handle RRC procedures/messages in a sequential (rather than interleaved) manner.

Figure 4:
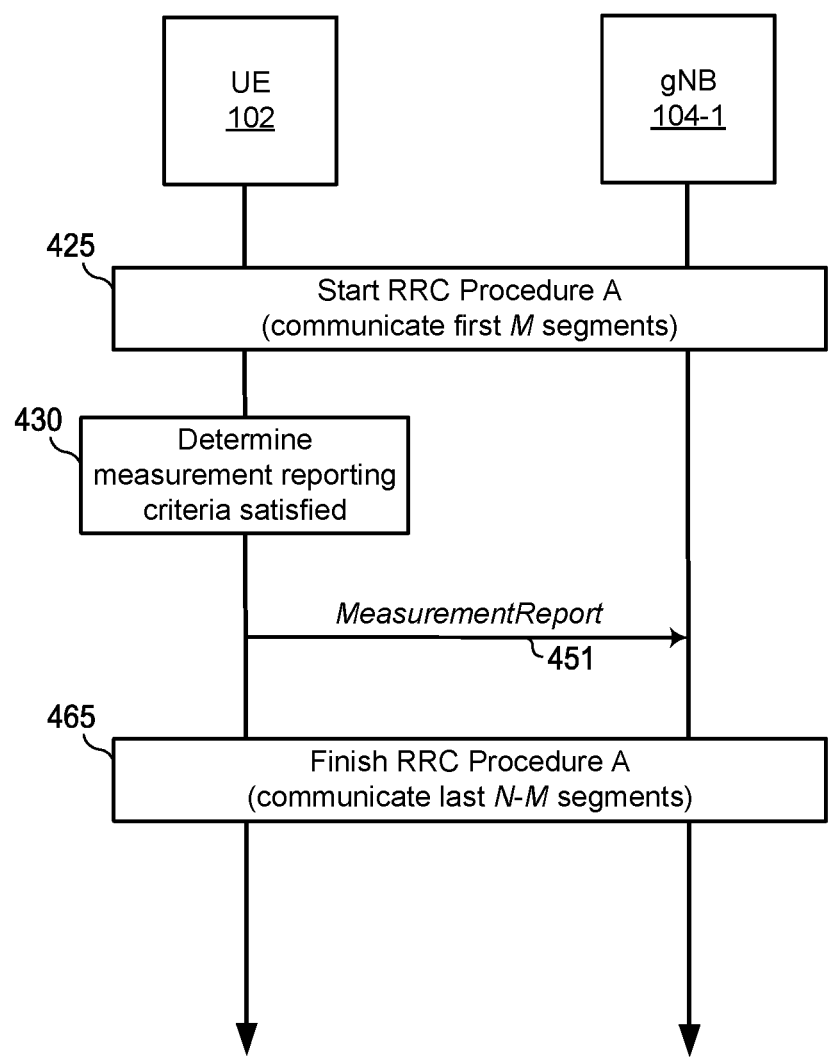
Figure 5:
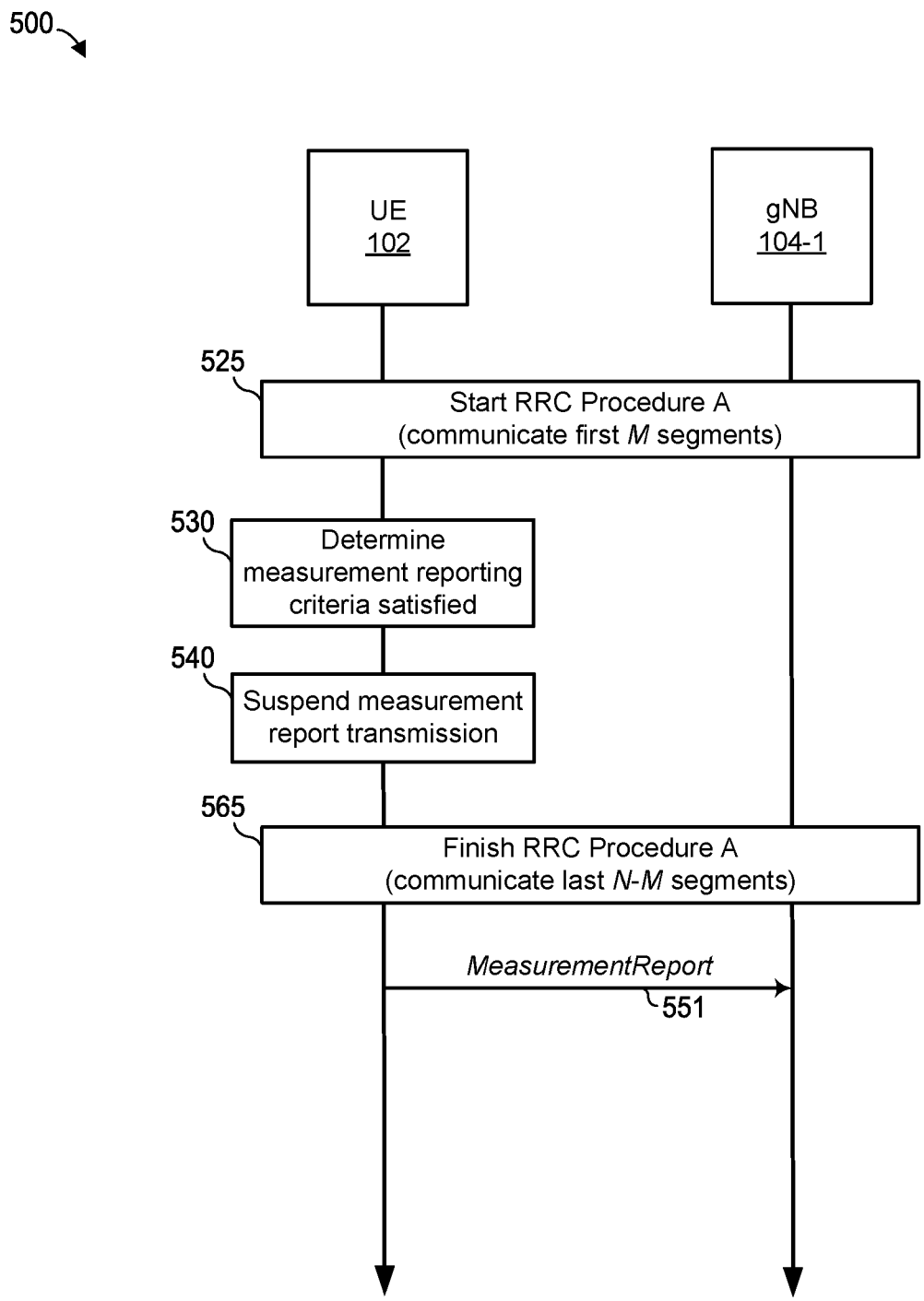

FIGS. 4 and 5 correspond to implementations and/or scenarios in which the intervening event is the satisfaction of one or more measurement reporting criteria, with messaging diagram 400 of FIG. 4 corresponding to the first technique described in connection with FIG. 2 (i.e., where the UE 102 and possibly base station 104-1 perform RRC Procedure B before completion of RRC Procedure A) and messaging diagram 500 of FIG. 5 corresponding to the second technique described in connection with FIG. 3 (i.e., where the UE 102 instead suspends performance of RRC Procedure B until after completion of RRC Procedure A). In the messaging diagrams 400 and 500, the RRC controller 124 of the UE 102 may perform (or trigger, e.g., in the case of message transmission) all operations of the UE 102. Similarly, the RRC controller 164 may perform or trigger the operations of the base station 104-1.

Turning first to FIG. 4, in the messaging diagram 400, the UE 102 (and possibly also the base station 104-1) starts 425 RRC Procedure A, which includes the UE 102 transmitting the first M segments to the base station 104-1. Starting 425 RRC Procedure A in messaging diagram 400 may be the same as, or similar to, starting 225 RRC Procedure A in messaging diagram 200.

Next, the UE 102 determines 430 that one or more measurement reporting criteria is/are satisfied. In other words, the intervening event may be the satisfaction of the criteria, and the UE 102 may detect the intervening event (i.e., the detecting 230 of FIG. 2) by determining 430 that the criteria are satisfied. For example, the UE 102 (e.g., a PHY controller of UE 102) may measure one or more beams or carrier frequencies to obtain PHY measurements. The UE 102 (i.e., a PHY controller of UE 102, or the RRC controller 124) derives one or more measurements results from the PHY measurement(s). The one or more measurement results may be represented by one or more radio link quality metrics (e.g., reference signal received power (RSRP), reference signal received quality (RSRQ), signal to noise ratio (SNR), signal to noise and interference ratio (SINR), and/or other suitable metrics). The RRC controller 124 may determine whether the one or more measurements is/are beyond some threshold value or values, or whether the one or more measurement results is above some threshold value or values. In some implementations, the RRC controller 124 (or a PHY controller of UE 102) may filter the PHY measurement(s) to generate metric values that account for the duration of any radio link degradation.

In this example, the measurement reporting procedure corresponds to the "RRC Procedure B" of FIG. 2. Thus, after the UE 102 determines 430 that the measurement reporting criteria are satisfied, the UE 102 transmits 451 a MeasurementReport RRC message to the base station 104-1 (e.g., in accordance with the 5G specification). The UE 102 may transmit 451 the MeasurementReport RRC message with the same timing, relative to the determination 430, that the UE 102 would have transmitted the MeasurementReport RRC message under other circumstances (i.e., if the determination 430 had instead occurred before or after the entirety of RRC Procedure A). Thereafter, the UE 102 (and possibly also the base station 104-1) finishes 465 RRC Procedure A, which includes the UE 102 transmitting the last N–M segments to the base station 104-1. Finishing 465 RRC Procedure A in messaging diagram 400 may be the same as, or similar to, finishing 265 RRC Procedure A in messaging diagram 200. In one implementation, the UE 102 may not be able to immediately transmit 451 the MeasurementReport RRC message in response to the determination 430 due to processing time in generating the MeasurementReport RRC message and/or interrupting RRC Procedure A. During the processing time, the UE 102 continues to sequentially transmit the (M+1)-th through (M+L)-th segments to the base station 104-1, where 0<L<(N−M). After the processing time, the UE 102 transmits 451 the MeasurementReport RRC message. After the UE 102 transmits 451 the MeasurementReport RRC message, the UE 102 sequentially transmits the ((M+L+1)-th through N-th) segments to the base station 104-1.

In some implementations, when the base station 104-1 receives the MeasurementReport RRC message from the UE 102, and before the base station 104-1 receives all N segments of the segmented RRC message, the base station 104-1 processes the MeasurementReport RRC message by extracting measurement results from the message. In some implementations and/or scenarios, in response to the MeasurementReport RRC message, the base station 104-1 transmits an RRCReconfiguration message to the UE 102, to reconfigure the UE 102. For example, the RRCReconfiguration message may cause the UE 102 to configure to a particular secondary cell or a particular primary secondary cell (e.g., cell 106-2). In other implementations and/or scenarios, the RRCReconfiguration message may cause the UE 102 to reconfigure or release a previous configuration that base station 104-1 (or another base station) sent to the UE 102. In some implementations and/or scenarios, the base station 104-1 transmits the RRCReconfiguration message to the UE 102 before receiving the N-th segment of the segmented RRC message from the UE 102. The base station 104-1 may then receive an RRCReconfigurationComplete message from the UE 102 in response to the RRCReconfiguration message, either before or after the base station 104-1 receives the N-th segment. In other implementations, the base station 104-1 transmits the RRCReconfiguration message after receiving the N-th segment from the UE 102, and receives an RRCReconfigurationComplete message from the UE 102 in response.

In some implementations, the base station 104-1 implements a measurement report handler, which processes the received MeasurementReport RRC message, in addition to an RRC segment message handler that processes the received, segmented RRC message. For example, the measurement report handler and the RRC segment message handler may be software routines or threads executed by the RRC controller 164 of the base station 104-1.

Turning next to FIG. 5, in the messaging diagram 500, the UE 102 (and possibly also the base station 104-1) starts 525 RRC Procedure A, which includes the UE 102 transmitting the first M segments to the base station 104-1. Starting 525 RRC Procedure A in messaging diagram 500 may be the same as, or similar to, starting 325 RRC Procedure A in messaging diagram 300.

Next, the UE 102 determines 530 that one or more measurement reporting criteria is/are satisfied. In other words, the intervening event may be the satisfaction of the criteria, and the UE 102 may detect the intervening event (i.e., the detecting 330 of FIG. 3) by determining 530 that the criteria are satisfied. The UE 102 may determine 530 that the criteria are satisfied in the manner described above with reference to the determination 430 of FIG. 4, for example.

In this example, the UE 102 suspends 540 the measurement reporting procedure (i.e., "RRC Procedure B" of FIG. 3) until after the UE 102 transmits the remaining segments. That is, the UE 102 prevents itself from transmitting a MeasurementReport RRC message to the base station 104-1 until after transmission of the remaining segments. Thus, the UE 102 (and possibly also the base station 104-1) first finishes 565 RRC Procedure A, which includes the UE 102 transmitting the last N–M segments to the base station 104-1.

After completion of RRC Procedure A, the UE 102 transmits 551 a MeasurementReport RRC message to the base station 104-1 (e.g., in accordance with the 5G specification). In some implementations, the UE 102 only transmits 551 the MeasurementReport RRC message at this time if the one or more measurement reporting criteria is/are still satisfied for the latest measurement result(s) (i.e., the UE 102 may first repeat the determining 530 operation, after receiving the N-th segment and before transmitting 551 the MeasurementReport RRC message). Finishing 565 RRC Procedure A in messaging diagram 400 may be the same as, or similar to, finishing 365 RRC Procedure A in messaging diagram 300, and transmitting 551 the MeasurementReport RRC message may be the same as, or similar to, transmitting 451 the MeasurementReport RRC message in messaging diagram 400.

In some implementations, the UE 102 suspends 540 the measurement reporting procedure as a result of receiving an RRC Message A from the base station 104-1 at an earlier time (e.g., an RRC Message A that the base station 104-1 transmits when starting 525 RRC Procedure A, in a transmission similar to transmission 202 of FIG. 2). For example, in response to receiving the RRC Message A, the UE 102 may set or configure itself to a non-reporting state in which measurement reporting is disallowed irrespective of monitored PHY measurements. Later, after detecting 530 that the measurement reporting criteria are satisfied while transmitting the segmented RRC message, the UE 102 may suspend 540 the triggered measurement reporting procedure in response to the UE 102 being in the non-reporting state. The UE 102 may then set or configure itself back to a reporting state after completion of RRC Procedure A (e.g., after transmitting the N-th segment).

In some implementations, when the base station 104-1 receives the MeasurementReport RRC message from the UE 102 (after receiving all N segments of the segmented RRC message), the base station 104-1 processes the MeasurementReport RRC message by extracting measurement results from the message. In some implementations and/or scenarios, in response to the MeasurementReport RRC message, the base station 104-1 transmits an RRCReconfiguration message to the UE 102, to reconfigure the UE 102. For example, the RRCReconfiguration message may cause the UE 102 to configure to a particular secondary cell or a particular primary secondary cell (e.g., cell 106-2). In other implementations and/or scenarios, the RRCReconfiguration message may cause the UE 102 to reconfigure or release a previous configuration sent to the UE 102. In either implementation/scenario, the base station 104-1 may receive an RRCReconfigurationComplete message from the UE 102 in response to the RRCReconfiguration message. As discussed above in connection with FIG. 4, in some implementations, the base station 104-1 implements a measurement report handler that processes the received MeasurementReport RRC message and an RRC segment message handler that processes the received, segmented RRC message.

Figure 6:
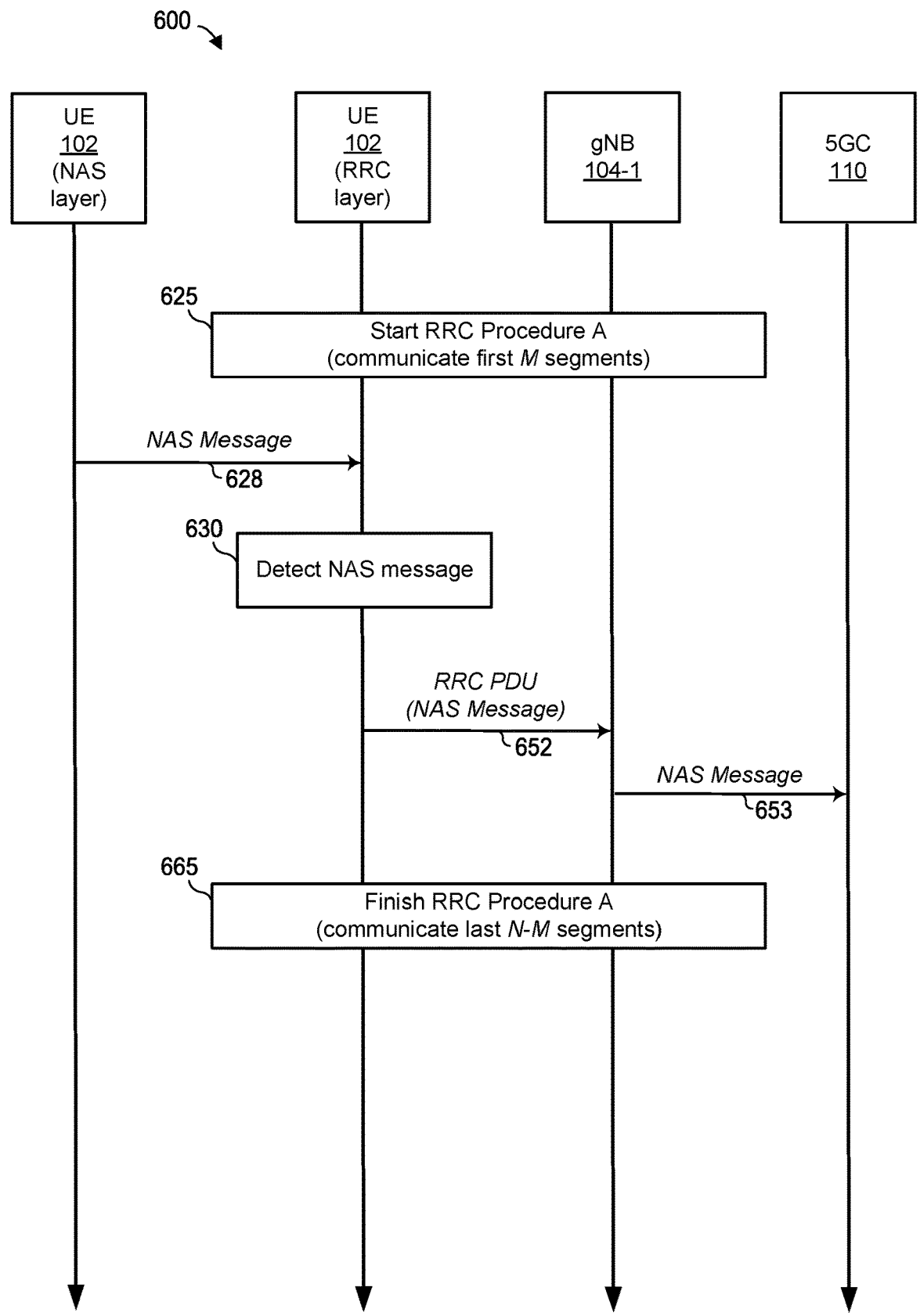
Figure 7:
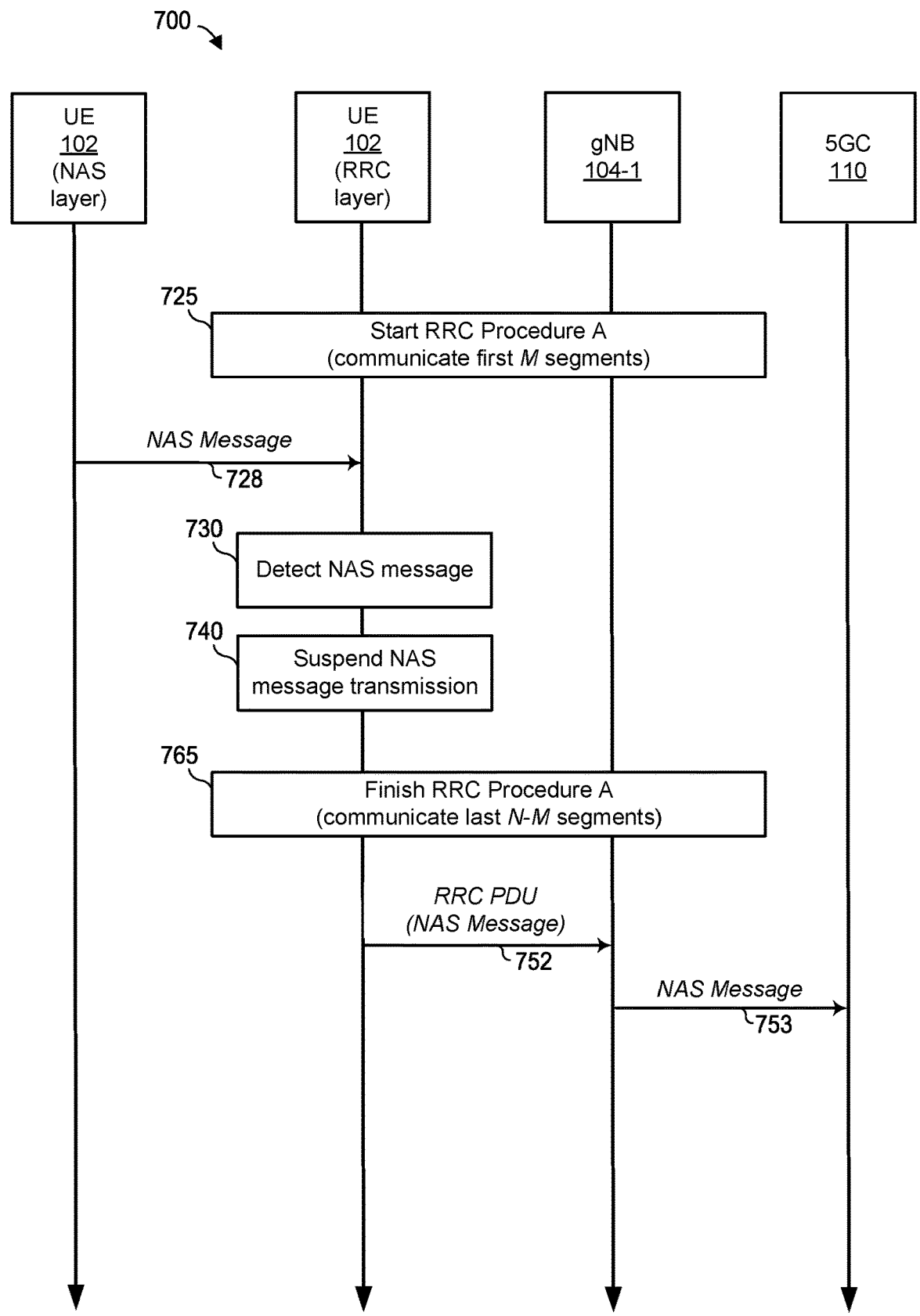
Figure 8:
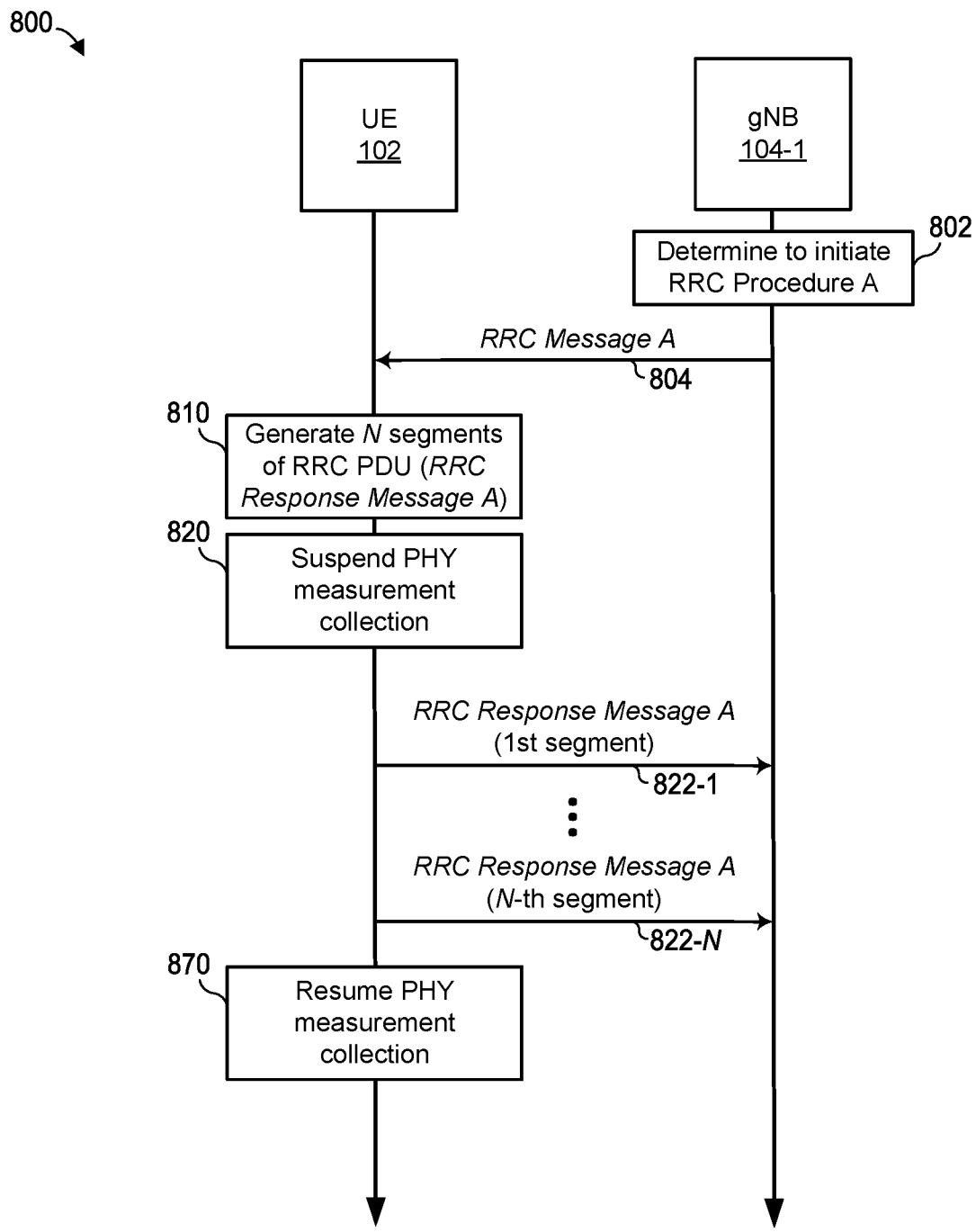

FIGS. 6 and 7 correspond to implementations and/or scenarios in which the intervening event is a NAS message being ready for transmission to the base station 104-1 (e.g., the RRC layer receiving the NAS message from a NAS layer, within the UE 102). Messaging diagram 600 of FIG. 6 corresponds to the first technique described above in connection with FIG. 2 (i.e., where the UE 102 and possibly base station 104-1 perform RRC Procedure B before completion of RRC Procedure A) and messaging diagram 700 of FIG. 7 corresponds to the second technique described above in connection with FIG. 3 (i.e., where the UE 102 instead suspends performance of RRC Procedure B until after completion of RRC Procedure A). In the messaging diagrams 600 and 700, a controller corresponding to the layer shown (e.g., the RRC controller 124 for the "RRC layer" operations, and the NAS controller 126 for the "NAS layer" operations) may perform (or trigger, e.g., in the case of message transmission) all operations of the UE 102. Similarly, the RRC controller 164 may perform or trigger the operations of the base station 104-1.

Turning first to FIG. 6, in the messaging diagram 600, the UE 102 (and possibly also the base station 104-1) starts 625 RRC Procedure A, which includes the UE 102 transmitting the first M segments to the base station 104-1. More specifically, the RRC controller 124 and possibly the RRC controller 164 cause the respective device(s) (UE 102 and possibly base station 104-1) to start 625 RRC Procedure A. Starting 625 RRC Procedure A in messaging diagram 600 may be the same as, or similar to, starting 225 RRC Procedure A in messaging diagram 200.

Next, one of NAS layer(s) 150 at UE 102 (e.g., NAS controller 126) sends 628 a NAS message to the RRC layer 140 at UE 102 (e.g., to RRC controller 124), and the RRC layer 140 at UE 102 (e.g., RRC controller 124) detects 630 the received NAS message. For example, the intervening event may be viewed as the RRC controller 124 receiving the NAS message sent 628 by the NAS controller 126, and the UE 102 may detect the intervening event (i.e., the detecting 230 of FIG. 2) by detecting 630 the NAS message at the RRC layer 140.

In this example, communication of the NAS message from the UE 102 to the base station 104-1 corresponds to the "RRC Procedure B" of FIG. 2. Thus, after the UE 102 detects 630 the NAS message, the UE 102 packages the NAS message in an RRC PDU, and transmits 652 the RRC PDU to the base station 104-1. The base station 104-1 then transmits 653 the NAS message to a node of the 5GC 110. The UE 102 may transmit 652 the RRC PDU containing the NAS message with the same timing, relative to the detection 630 of the NAS message, that the UE 102 would have transmitted the RRC PDU under other circumstances (i.e., if the detection 630 had instead occurred before or after the entirety of RRC Procedure A). Thereafter, the UE 102 (and possibly also the base station 104-1) finishes 665 RRC Procedure A, which includes the UE 102 transmitting the last N−M segments to the base station 104-1. Finishing 665 RRC Procedure A in messaging diagram 600 may be the same as, or similar to, finishing 265 RRC Procedure A in messaging diagram 200.

Turning next to FIG. 7, in the messaging diagram 700, the UE 102 (and possibly also the base station 104-1) starts 725 RRC Procedure A, which includes the UE 102 transmitting the first M segments to the base station 104-1. Starting 725 RRC Procedure A in messaging diagram 700 may be the same as, or similar to, starting 325 RRC Procedure A in messaging diagram 300.

Next, one of NAS layer(s) 150 at UE 102 (e.g., NAS controller 126) sends 728 a NAS message to the RRC layer 140 at UE 102 (e.g., to RRC controller 124), and the RRC layer 140 at UE 102 (e.g., RRC controller 124) detects 730 the received NAS message. For example, the intervening event may be viewed as the RRC controller 124 receiving the NAS message sent 728 by the NAS controller 126, and the UE 102 may detect the intervening event (i.e., the detecting 330 of FIG. 3) by detecting 730 the NAS message at the RRC layer 140.

In this example, the UE 102 suspends 740 the NAS transmission (i.e., "RRC Procedure B" of FIG. 3) until after the UE 102 transmits the remaining segments. Thus, the UE 102 (and possibly also the base station 104-1) finishes 765 RRC Procedure A, which includes the UE 102 transmitting the last N−M segments to the base station 104-1 and, after completion of RRC Procedure A, the UE 102 transmits 752 an RRC PDU containing the NAS message to the base station 104-1. The base station 104-1 then transmits 753 the NAS message to a node of the 5GC 110. Finishing 765 RRC Procedure A in messaging diagram 700 may be the same as, or similar to, finishing 365 RRC Procedure A in messaging diagram 300. Moreover, transmitting 752 the RRC PDU containing the NAS message and transmitting 753 the NAS message to the node of the 5GC 110, may be the same as, or similar to, transmitting 652 an RRC PDU containing the NAS message and transmitting 653 the NAS message to the node of the 5GC 110, respectively, in messaging diagram 600. The implementation of FIG. 7 may be particularly advantageous if the base station 104-1 cannot process a NAS message while receiving a segmented RRC message.

FIG. 8 depicts a messaging diagram 800 that corresponds to an alternative technique in which the UE 102 ensures that an intervening event (specifically, in this case, a measurement report trigger) does not occur during transmission of the segmented RRC message, and/or cannot interrupt transmission of the segmented RRC message. In the messaging diagram 800, the RRC controller 124 of the UE 102 may perform (or trigger, e.g., in the case of message transmission) all operations of the UE 102. Similarly, the RRC controller 164 may perform or trigger the operations of the base station 104-1.

At the start of the messaging diagram 800, the UE 102 and the base station 104-1 have already established an RRC connection. As seen in FIG. 8, the base station 104-1 determines 802 to initiate RRC Procedure A, and then transmits 804 an RRC message ("RRC Message A") to the UE 102. RRC Procedure A may be a UE capability transfer procedure as defined in 3GPP TS 38.331 v15.5.1, and RRC Message A may be a UECapabilityEnquiry message, for example.

As in the implementations of FIGS. 2 through 7, the UE 102 responds to RRC Message A by generating 810 all N segments of an RRC PDU containing an RRC response message ("RRC Response Message A"), where N is an integer greater than one (e.g., two, four, 10, 16, etc.). If RRC Procedure A is a UE capability transfer procedure, for example, then RRC Response Message A may be a UECapabilityInformation message that specifies various capabilities of the UE 102 (e.g., radio access technologies supported by the UE 102, etc.). As one example, generating 810 the N segments may include generating the RRC Response Message A, including the RRC Response Message A in an RRC PDU, and then dividing the RRC PDU into the N segments. In other implementations, RRC Procedure A does not include the transmission 804 of RRC Message A, and the segmented RRC message is not a responsive message. Moreover, as discussed above in connection with FIG. 2, the UE 102 may instead generate 810 the N segments before receiving RRC Message A.

Unlike the techniques reflected in FIGS. 2 through 7, however, the UE 102 also suspends 820 the collection of one or more PHY measurements associated with one or more beams or carrier frequencies in response to receiving RRC Message A. The PHY measurement(s) may be any suitable measurement(s), normally collected by the UE 102, that correspond to the specific time and/or frequency resources of the one or more beams or carrier frequencies (e.g., RSRP, RSRQ, SNR, SINR, and/or one or more other suitable metrics), and specifically the downlink from the base station 104-1 and/or the base station 104-2 to the UE 102. While the PHY measurement(s) is/are in the suspended state, the PHY measurement(s) cannot trigger a measurement reporting RRC procedure at the UE 102. Thus, the UE 102 cannot transmit a measurement report RRC message to the base station 104-1 while the PHY measurement(s) is/are in the suspended state.

The UE 102 then sequentially transmits (822-1 through 822-N) all of the N segments to the base station 104-1. In other implementations, the UE 102 does not generate 810 all N segments before transmitting 822-1 the first segment. For example, the UE 102 may instead generate 810 each segment just prior to transmitting 822 that segment, such that the generating 810 and transmitting 822 operations are interleaved.

After the UE 102 transmits 822-N the final (N-th) segment, the UE 102 resumes 870 collection of the suspended PHY measurement(s) (e.g., in response to transmission 822-N, or after the expiration of a timer with a duration that ensures that transmission 822-N occurs before the timer expiration, etc.). If a measurement report is triggered after the UE 102 resumes 870 collection of the PHY measurement(s), the UE 102 and base station 104-1 may exchange messages in the manner discussed above in connection with FIG. 5 (e.g., with the UE 102 transmitting 551 a MeasurementReport RRC message and possibly an RRCReconfiguration message to the base station 104-1, and the base station 104-1 possibly transmitting an RRCReconfigurationComplete message to the UE 102, etc.), for example. Thus, in the implementation of FIG. 8, measurement reporting may in some scenarios be slightly delayed, but cannot interrupt the transmission (822-1 through 822-N) of the segmented RRC Response Message A. Like the technique of FIG. 3, the technique of FIG. 8 may be particularly useful in systems where base stations such as base station 104-1 can only handle RRC procedures/messages in a sequential (rather than interleaved) manner.

Figure 9:
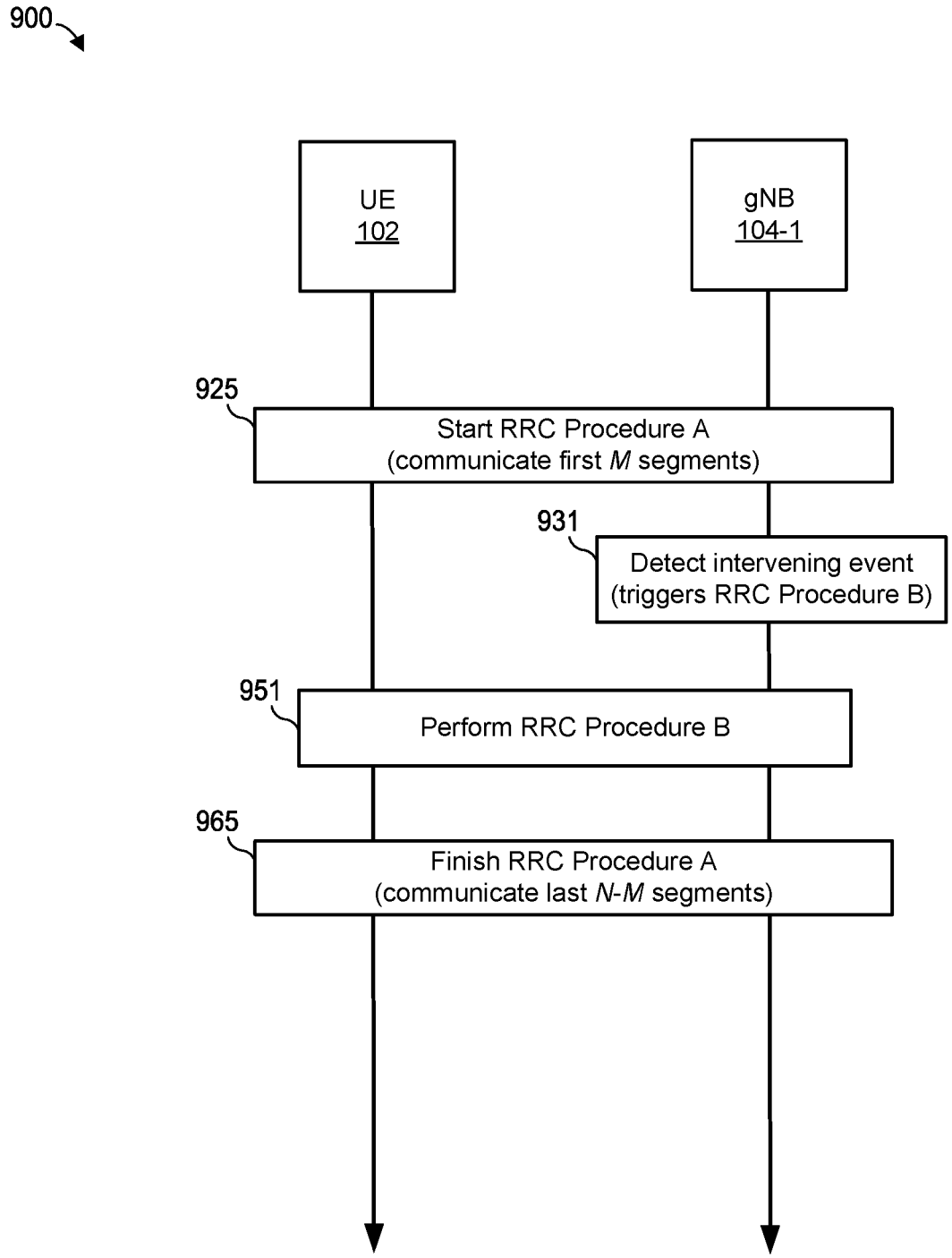
Figure 10:
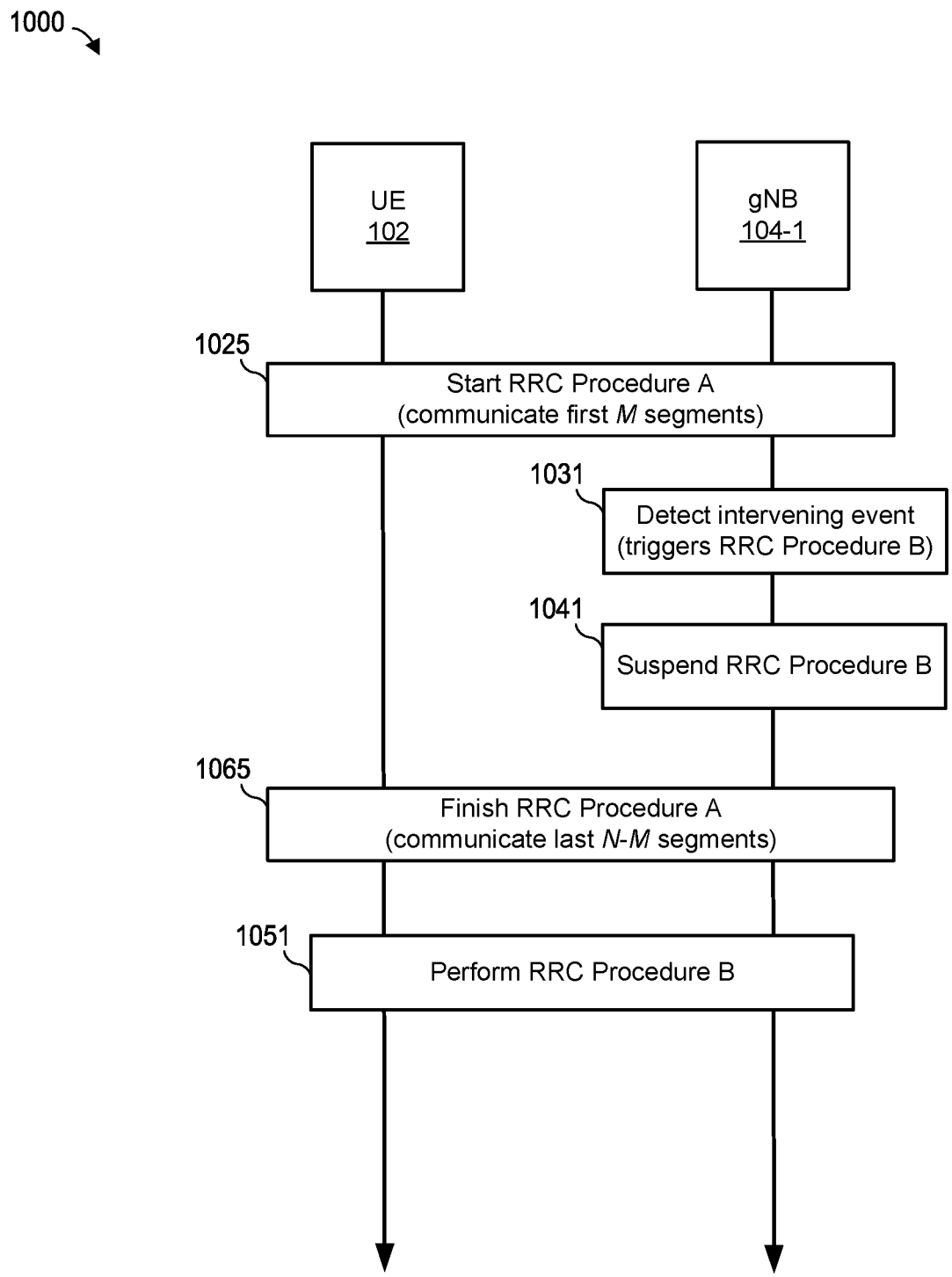
Figure 11:
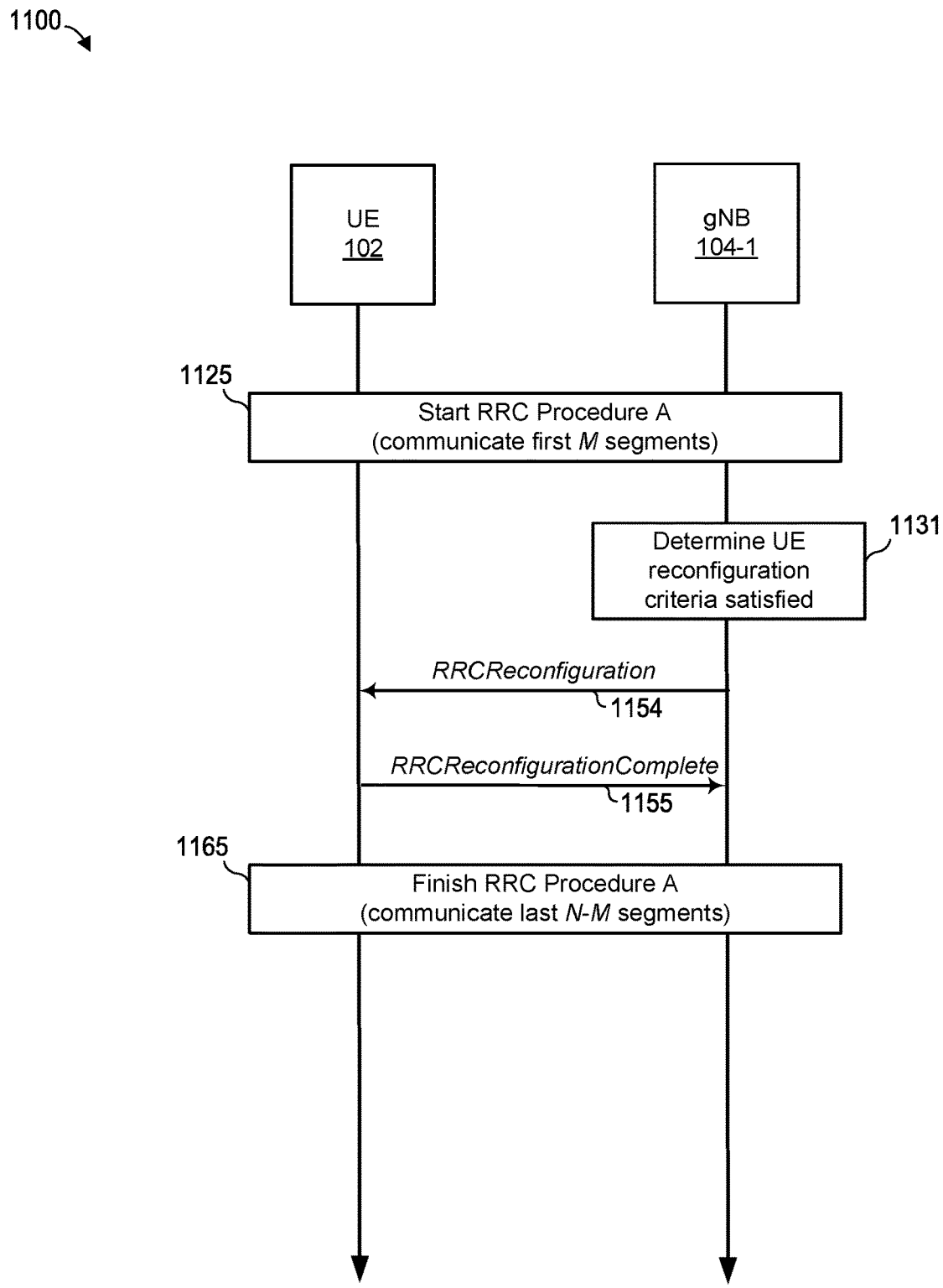
Figure 12:
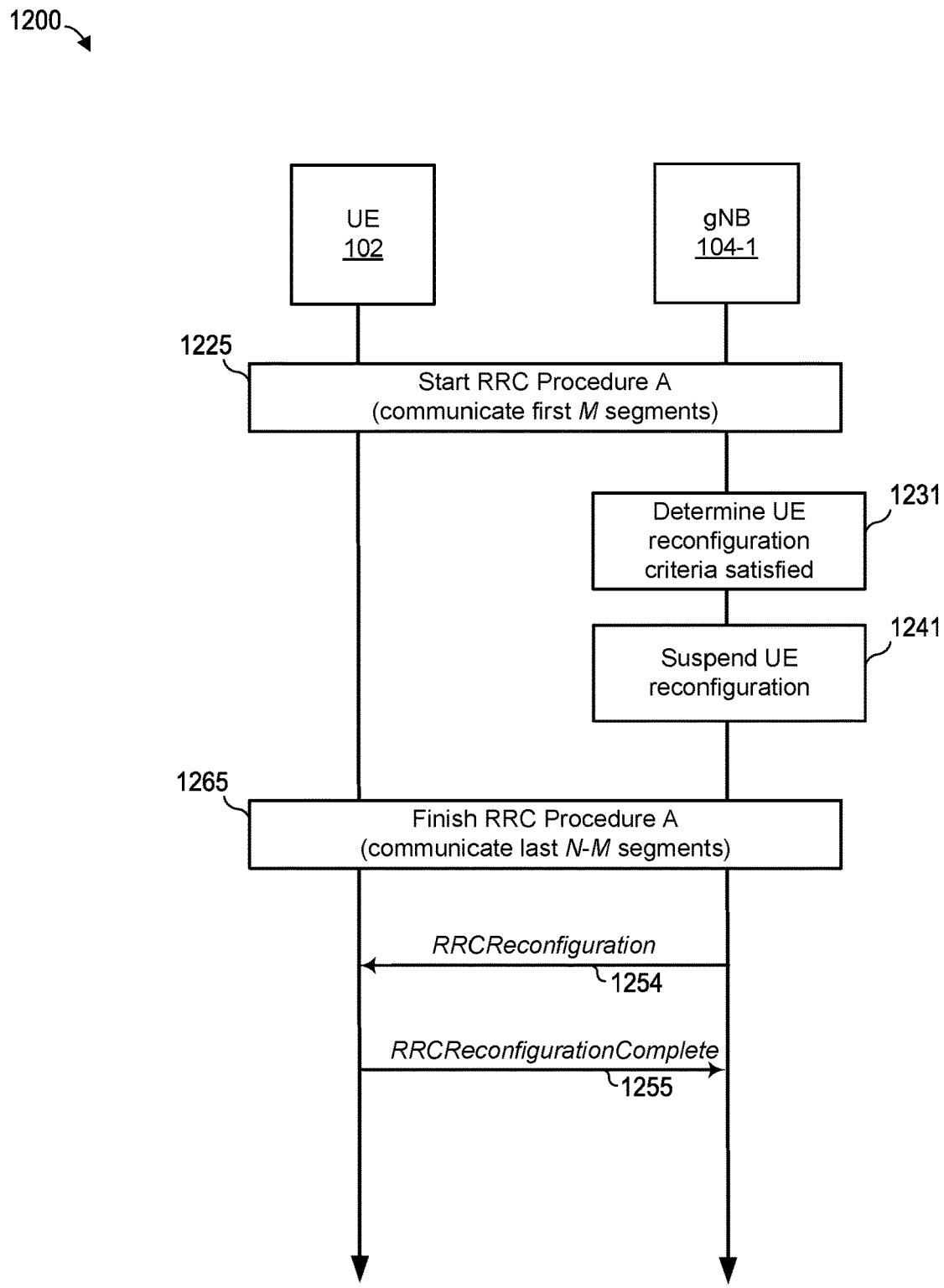
Figure 13:
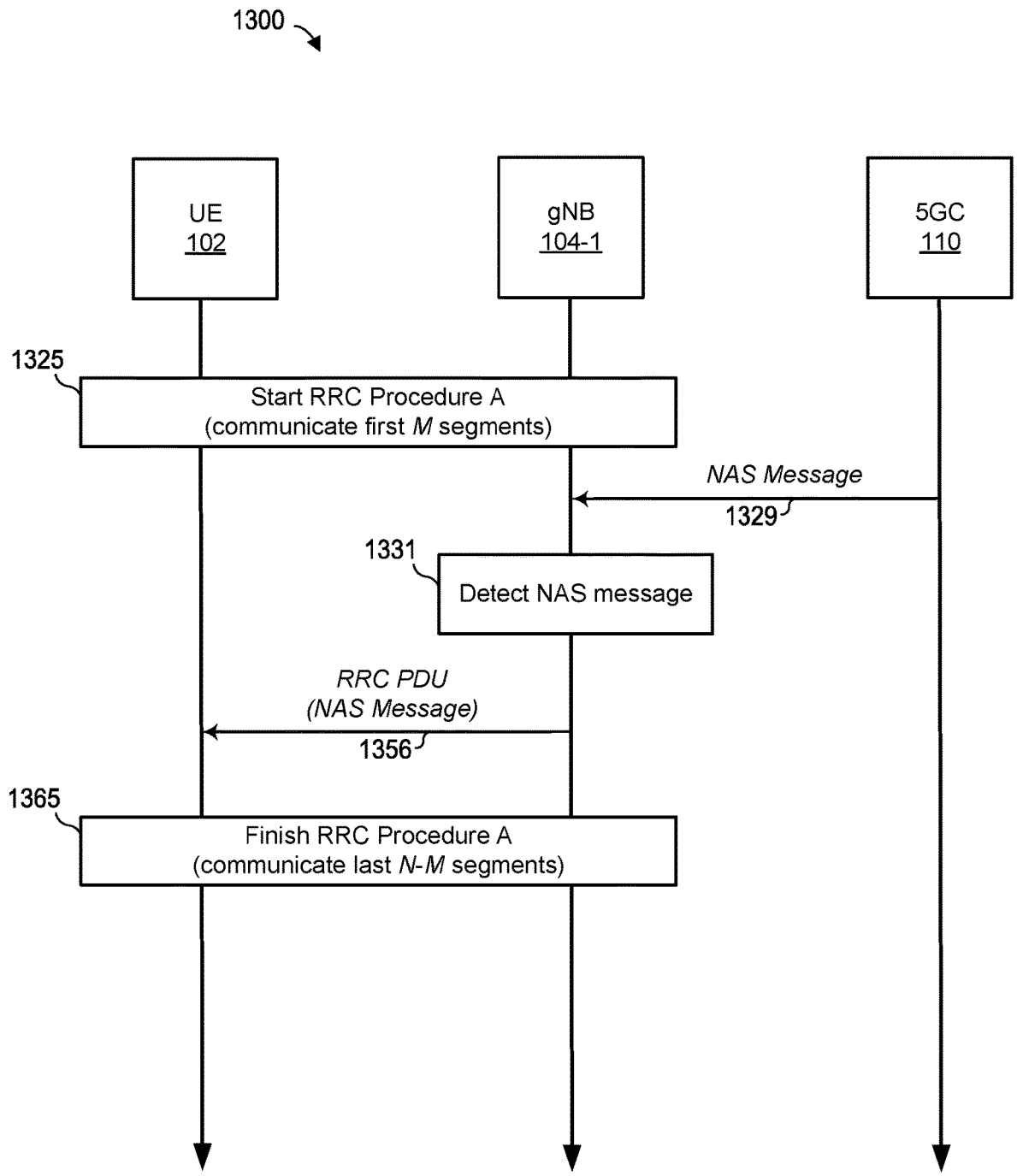
Figure 14:
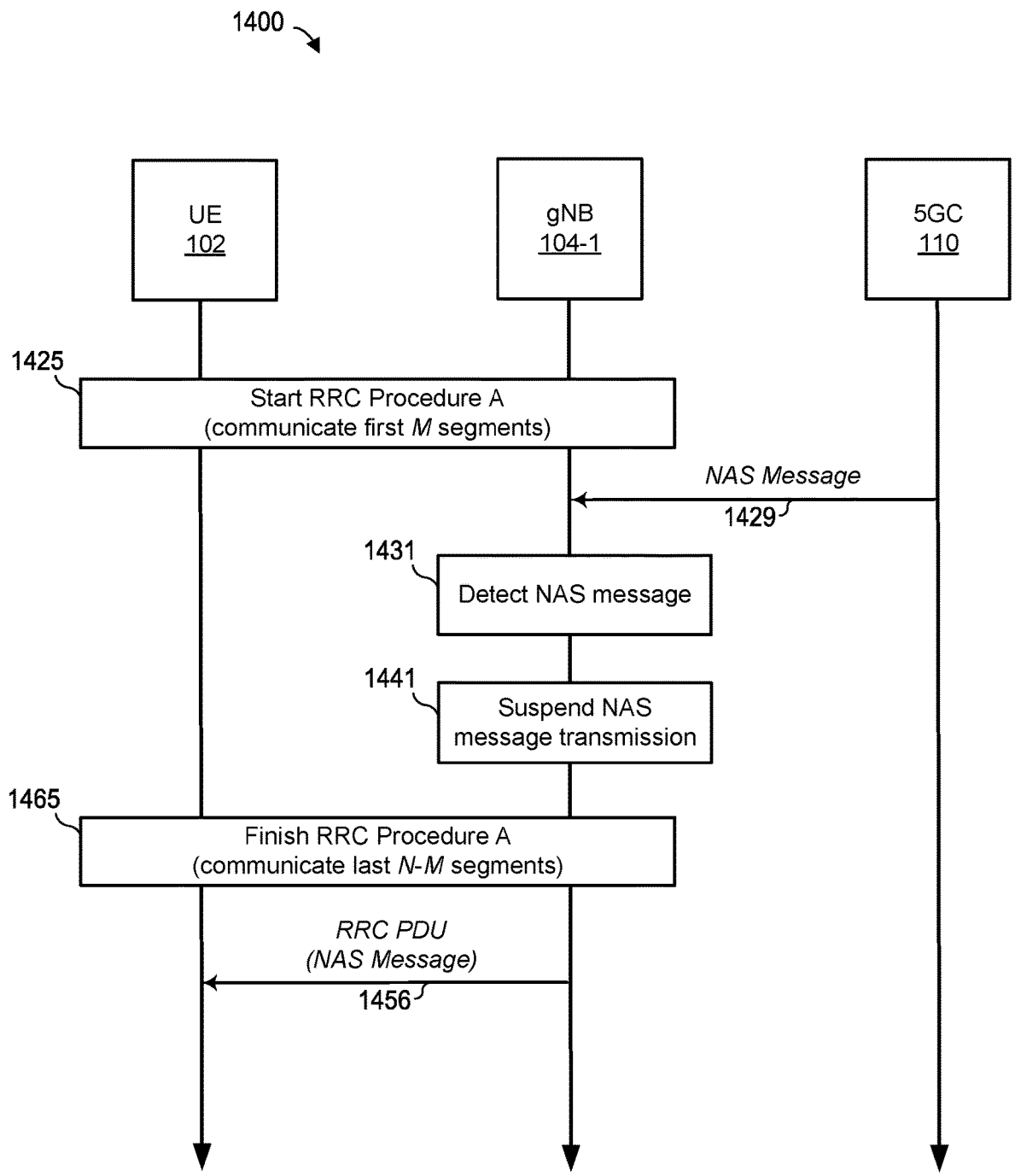

Whereas FIGS. 2 through 7 depict techniques in which the UE 102 detects a particular intervening event while transmitting a segmented RRC message, and FIG. 8 depicts a technique in which the UE 102 need not even attempt to detect an intervening event, FIGS. 9 through 14 depict techniques in which the base station 104-1 detects an intervening event. FIG. 9 depicts the general case of a first technique in which the base station 104-1 performs an RRC procedure triggered by the intervening event before the base station 104-1 receives the remaining segments from the UE 102 (i.e., without waiting for the UE 102 to transmit the remaining segments), while FIG. 10 depicts the general case of a second technique in which the base station 104-1 suspends the triggered RRC procedure until after the base station 104-1 receives the remaining segments from the UE 102. FIGS. 12 through 14 depict specific, example implementations and/or scenarios corresponding to the technique of FIG. 9 or the technique of FIG. 10.

Referring first to FIG. 9, a messaging diagram 900 depicts example messages that the UE 102 and the base station 104-1 of FIG. 1 may exchange, along with associated operations, according to some implementations and scenarios. As noted above, FIG. 9 depicts the general case of a first technique in which the base station 104-1 performs an RRC procedure triggered by the intervening event before receiving the remaining segments from the UE 102. In the messaging diagram 900, the RRC controller 124 of the UE 102 may perform (or trigger, e.g., in the case of message transmission) all operations of the UE 102. Similarly, the RRC controller 164 may perform or trigger the operations of the base station 104-1.

At the start of the messaging diagram 900, the UE 102 and the base station 104-1 have already established an RRC connection. As seen in FIG. 9, the UE 102 (and possibly also the base station 104-1) starts 925 RRC Procedure A, which includes the UE 102 transmitting the first M of N segments to the base station 104-1 (0<M<N). Starting 925 RRC Procedure A in messaging diagram 900 may be the same as, or similar to, starting 225 RRC Procedure A in messaging diagram 200.

Next, the base station 104-1 detects 931 an intervening event that triggers an RRC procedure. As will be seen from the examples discussed below with reference to FIGS. 11 through 14, the intervening event may be any event that triggers a particular RRC procedure (referred to in FIG. 9 as "RRC Procedure B"), and the triggered RRC procedure may be any procedure that requires the base station 104-1 to transmit at least one RRC message to the UE 102 via the radio link. For example, the intervening event may be one or more criteria/conditions being satisfied (e.g., criteria for reconfiguring the UE 102), a NAS message being ready for transmission to the UE 102 via the radio link (e.g., the 5GC 110 (e.g., an AMF) sending the NAS message to the base station 104-1), or another type of event.

After the base station 104-1 detects 931 the intervening event, the base station 104-1 (and possibly also the UE 102) performs 951 RRC Procedure B, which includes the base station 104-1 transmitting one or more RRC messages to the UE 102 (e.g., an RRC PDU containing a NAS message or a RRCReconfiguration message). Thereafter, the UE 102 (and possibly also the base station 104-1) finishes 965 RRC Procedure A, which includes the UE 102 transmitting the last N−M segments to the base station 104-1. Finishing 965 RRC Procedure A in messaging diagram 900 may be the same as, or similar to, finishing 265 RRC Procedure A in messaging diagram 200.

In the implementation of FIG. 9, the UE 102 is configured to successfully receive and process RRC message(s) transmitted by the base station 104-1 as a part of RRC Procedure B, irrespective of whether the UE 102 receives such RRC message(s) during transmission of a segmented RRC message associated with RRC Procedure A. Thus, the UE 102 and the base station 104-1 can successfully complete RRC Procedure A. Moreover, the base station 104-1 (and possibly also the UE 102) can perform 951 RRC Procedure B successfully, and without adverse effects (e.g., radio link failure or suboptimal system performance). This is because the base station 104-1 does not (at least in some implementations) alter the timing of RRC Procedure B relative to the triggering event, irrespective of whether RRC Procedure A is currently in progress. In some implementations, the base station 104-1 may not be able to immediately perform 951 RRC Procedure B in response to the detection 931, due to processing time in preparation for RRC Procedure B, generating the at least one RRC message, and/or interrupting RRC Procedure A. During the processing time, the base station 104-1 continues to sequentially transmit the (M+1)-th through (M+L)-th segments to the base station 104-1, where $0<L<(N-M)$. After the base station 104-1 finishes performing 951 RRC Procedure B, the base station 104-1 sequentially transmits the (M+L+1)-th through N-th segments to the UE 102.

Referring next to FIG. 10, a messaging diagram 1000 depicts example messages that the UE 102 and the base station 104-1 of FIG. 1 may exchange, along with associated operations, according to other implementations and scenarios. As noted above, FIG. 10 depicts the general case of a second technique in which the base station 104-1 suspends the RRC procedure triggered by the intervening event until after receiving the remaining segments from the UE 102. In the messaging diagram 1000, the RRC controller 124 of the UE 102 may perform (or trigger, e.g., in the case of message transmission) all operations of the UE 102. Similarly, the RRC controller 164 may perform or trigger the operations of the base station 104-1.

As seen in FIG. 10, the UE 102 (and possibly also the base station 104-1) starts 1025 RRC Procedure A, which includes the UE 102 transmitting the first M segments to the base station 104-1. Starting 1025 RRC Procedure A in messaging diagram 1000 may be the same as, or similar to, starting 225 RRC Procedure A in messaging diagram 200.

Next, the base station 104-1 detects 1031 an intervening event that triggers RRC Procedure B. Detecting 1031 the intervening event in messaging diagram 1000 may be the same as, or similar to, detecting 931 the intervening event in messaging diagram 900. As discussed above with reference to FIG. 9, for example, the intervening event may be any event that triggers RRC Procedure B, and RRC Procedure B may be any procedure that requires the base station 104-1 to transmit at least one RRC message to the UE 102 via the radio link.

After the base station 104-1 detects 1031 the intervening event, the base station 104-1 suspends 1041 RRC Procedure B. That is, the base station 104-1 does not perform or initiate RRC Procedure B at the time that the base station 104-1 would normally (i.e., but for the suspension 1041) perform or initiate RRC Procedure B in response to detecting 1031 the triggering event. Instead, the base station 104-1 waits until the UE 102 (and possibly also the base station 104-1) finishes 1065 RRC Procedure A, which includes the UE 102 transmitting the last N–M segments to the base station 104-1. Thereafter, the base station 104-1 (and possibly also the UE 102) performs 1051 RRC Procedure B. Finishing 1065 RRC Procedure A and performing 1051 RRC Procedure B in messaging diagram 1000 may be the same as, or similar to, finishing 965 RRC Procedure A and performing 951 RRC Procedure B, respectively, in messaging diagram 900, but in reverse order.

In the implementation of FIG. 10, the UE 102 and the base station 104-1 can successfully complete RRC Procedure A because, at least in some implementations, there is no intervening RRC message (of another RRC procedure) while the UE 102 transmits the N segments to the base station 104-1. Moreover, the delay in performing 1051 RRC Procedure B may be slight enough to avoid substantial adverse effects (e.g., radio link failure or poor system performance).

FIGS. 11 and 12 correspond to implementations and/or scenarios in which the intervening event is one or more criteria for reconfiguring the UE 102 being satisfied. Messaging diagram 1100 of FIG. 11 corresponds to the first technique described above in connection with FIG. 9 (i.e., where the base station 104-1 initiates RRC Procedure B before completion of RRC Procedure A) and messaging diagram 1200 of FIG. 12 corresponds to the second technique described above in connection with FIG. 10 (i.e., where the base station 104-1 instead suspends performance of RRC Procedure B until after completion of RRC Procedure A). In the messaging diagrams 1100 and 1200, the RRC controller 124 of the UE 102 may perform (or trigger, e.g., in the case of message transmission) all operations of the UE 102. Similarly, the RRC controller 164 may perform or trigger the operations of the base station 104-1.

Turning first to FIG. 11, in the messaging diagram 1100, the UE 102 (and possibly also the base station 104-1) starts 1125 RRC Procedure A, which includes the UE 102 transmitting the first M segments to the base station 104-1. More specifically, the RRC controller 124 and possibly the RRC controller 164 cause the respective device(s) (UE 102 and possibly base station 104-1) to start 1125 RRC Procedure A. Starting 1125 RRC Procedure A in messaging diagram 1100 may be the same as, or similar to, starting 925 RRC Procedure A in messaging diagram 900.

Next, the base station 104-1 determines 1131 that one or more criteria for reconfiguring the UE 102 are satisfied. The intervening event may be viewed as the existence of certain conditions that cause the criteria to be satisfied, and the base station 104-1 may detect the intervening event (i.e., the detecting 931 of FIG. 9) by determining 1131 that those criteria are satisfied. For example, the base station 104-1 may determine that the criteria is/are satisfied based on PHY measurements (e.g., collected directly by the base station 104-1, or by UE 102 and then transmitted to the base station 104-1) being above or below a predetermined threshold. In other implementations and/or scenarios, the base station 104-1 may determine that the criteria is/are satisfied based on radio resource management factors or conditions.

In the example of FIG. 11, reconfiguration of the UE 102 corresponds to the "RRC Procedure B" of FIG. 9. Thus, after the base station 104-1 determines 1131 that the reconfiguration criteria is/are satisfied, the base station 104-1 transmits 1154 an RRCReconfiguration message to the UE 102. The base station 104-1 may transmit 1154 the RRCReconfiguration message with the same timing, relative to the determination 1131, that the base station 104-1 would have transmitted the RRCReconfiguration message under other circumstances (i.e., if the determination 1131 had instead occurred before or after the entirety of RRC Procedure A). In some implementations, the base station 104-1 may not be able to immediately transmit the RRCReconfiguration message in response to the determination 1131, due to processing time in generating the RRCReconfiguration message and/or interrupting RRC Procedure A. During the processing time, the base station 104-1 continues to sequentially transmit the (M+1)-th through (M+L)-th segments to the base station 104-1, where $0<L<(N-M)$. After the base station 104-1 transmits the RRCReconfiguration message, the base station 104-1 sequentially transmits the (M+L+1)-th through N-th segments to the UE 102.

The RRCReconfiguration message may cause the UE 102 to configure itself according to radio resources specified in the RRCReconfiguration message. For example, the specified radio resources may include a measurement configuration, a PHY configuration, a MAC configuration, an RLC configuration, a PDCP configuration, or a service data adaptation protocol (SDAP) configuration. The measurement configuration may be a particular carrier frequency, a particular synchronization signal block (SSB), a particular channel state information reference signal (CSI-RS), or a particular measurement event upon which to perform measurement or measurement reporting, for example. The PHY configuration may include a configuration for receiving physical downlink control channel (PDCCH) or physical downlink shared channel (PDSCH) information, or for transmitting physical uplink control channel (PUCCH) information, physical uplink shared channel (PUSCH) information, or sounding reference signals (SRSs), or may include a configuration for uplink or downlink power control, for example.

After reconfiguring to specific radio resources in accordance with the RRCReconfiguration message, the UE 102 transmits 1155 an RRCReconfigurationComplete message to the base station 104-1. Thereafter, the UE 102 (and possibly also the base station 104-1) finishes 1165 RRC Procedure A, which includes the UE 102 transmitting the last N–M segments to the base station 104-1. Finishing 1165 RRC Procedure A in messaging diagram 1100 may be the same as, or similar to, finishing 965 RRC Procedure A in messaging diagram 900.

In the example of FIG. 11, the UE 102 prioritizes the transmission 1155 of the RRCReconfigurationComplete message over the transmission of the last N–M segments. In other implementations, however, the UE 102 prioritizes the transmission 1155 of the RRCReconfigurationComplete message over the transmission of some, but not all, of the last N–M segments. For example, the UE 102 may transmit 1155 the RRCReconfigurationComplete message after the UE 102 transmits the (M+1)-th segment to the base station 104-1, but before the UE 102 transmits the (M+2)-th segment to the base station 104-1. More generally, the UE 102 may transmit 1155 the RRCReconfigurationComplete message after the UE 102 transmits the (M+1)-th through (M+X)-th segment(s) to the base station 104-1, but before the UE 102 transmits the (M+X+1)-th segment to the base station 104-1, where X is an integer greater than zero and less than N–M. This may be advantageous if a layer that is lower than RRC layer 140 (e.g., layer 132, 134 or 136) has already processed the (M+1)-th through (M+X)-th segment(s) of the segmented RRC message at the UE 102. For example, at the UE 102, a controller corresponding to the lower layer may have already encrypted the (M+1)-th through (M+X)-th segment(s), or constructed a PDU of the lower layer that includes the (M+1)-th through (M+X)-th segment(s).

Turning next to FIG. 12, in the messaging diagram 1200, the UE 102 (and possibly also the base station 104-1) starts 1225 RRC Procedure A, which includes the UE 102 transmitting the first M segments to the base station 104-1. Starting 1225 RRC Procedure A in messaging diagram 1200 may be the same as, or similar to, starting 1025 RRC Procedure A in messaging diagram 1000.

Next, the base station 104-1 determines 1231 that one or more criteria for reconfiguring the UE 102 is/are satisfied. For example, the intervening event may be the satisfaction of the criteria, and the base station 104-1 may detect the intervening event (i.e., the detecting 1031 of FIG. 10) by determining 1231 that the criteria are satisfied. The base station 104-1 may determine 1231 that the criteria are satisfied in the manner described above with reference to the determination 1131 of FIG. 11, for example.

In this example, the base station 104-1 suspends 1241 the reconfiguration procedure (i.e., "RRC Procedure B" of FIG. 10) until after the base station 104-1 receives the remaining segments from the UE 102. That is, the base station 104-1 prevents itself from transmitting an RRCReconfiguration RRC message to the UE 102 until after the base station 104-1 receives the remaining segments from the UE 102. Thus, the UE 102 (and possibly also the base station 104-1) first finishes 1265 RRC Procedure A, which includes the UE 102 transmitting the last N–M segments to the base station 104-1. After completion of RRC Procedure A, the base station 104-1 and the UE 102 perform RRC Procedure B, which in this example includes the base station 104-1 transmitting 1254 an RRCReconfiguration RRC message to the UE 102 and the UE 102 transmitting 1255 a responsive RRCReconfigurationComplete RRC message to the base station 104-1. In some implementations, the base station 104-1 only transmits 1254 the RRCReconfiguration message to the UE 102 if the one or more reconfiguration criteria is/are still satisfied (i.e., the base station 104-1 may first repeat the determining 1231 after receiving the N-th segment and before transmitting 1254 the RRCReconfiguration message). Finishing 1265 RRC Procedure A in messaging diagram 1200 may be the same as, or similar to, finishing 1065 RRC Procedure A in messaging diagram 1000. Moreover, transmitting 1254 the RRCReconfiguration RRC message and transmitting 1255 the RRCReconfigurationComplete RRC message in messaging diagram 1200 may be the same as, or similar to, transmitting 1154 the RRCReconfiguration RRC message and transmitting 1155 the RRCReconfigurationComplete RRC message, respectively, in messaging diagram 1100.

FIGS. 13 and 14 correspond to implementations and/or scenarios in which the intervening event is a NAS message being ready for transmission to the UE 102 (or, equivalently, the base station 104-1 receiving the NAS message from the 5GC 110). Messaging diagram 1300 of FIG. 13 corresponds to the first technique described above in connection with FIG. 9 (i.e., where the base station 104-1 initiates RRC Procedure B before completion of RRC Procedure A) and messaging diagram 1400 of FIG. 14 corresponds to the second technique described above in connection with FIG. 10 (i.e., where the base station 104-1 instead suspends performance of RRC Procedure B until after completion of RRC Procedure A). In the messaging diagrams 1300 and 1400, the RRC controller 124 of the UE 102 may perform (or trigger, e.g., in the case of message transmission) all operations of the UE 102. Similarly, the RRC controller 164 may perform or trigger the operations of the base station 104-1.

Turning first to FIG. 13, in the messaging diagram 1300, the UE 102 (and possibly also the base station 104-1) starts 1325 RRC Procedure A, which includes the UE 102 transmitting the first M segments to the base station 104-1. Starting 1325 RRC Procedure A in messaging diagram 1300 may be the same as, or similar to, starting 925 RRC Procedure A in messaging diagram 900.

Next, the 5GC 110 transmits 1329 a NAS message to the base station 104-1, and the base station 104-1 detects 1331 the NAS message. For example, the intervening event may be viewed as the base station 104-1 receiving the NAS message transmitted 1329 by the 5GC 110, and the base station 104-1 may detect the intervening event (i.e., the detecting 931 of FIG. 9) by detecting 1331 the received NAS message.

In this example, communication of the NAS message from the base station 104-1 to the UE 102 corresponds to the "RRC Procedure B" of FIG. 9. Thus, after the base station 104-1 detects 1331 the NAS message, the base station 104-1 packages the NAS message in an RRC PDU, and transmits 1356 the RRC PDU to the UE 102. While not shown in FIG. 13, the RRC controller 124 of the UE 102 may then send the NAS message to the NAS controller 126 of the UE 102 in an IPL message. Thereafter, or possibly while still receiving the NAS message during the transmission 1356, the UE 102 (and possibly also the base station 104-1) finishes 1365 RRC Procedure A, which includes the UE 102 transmitting the last N−M segments to the base station 104-1. Finishing 1365 RRC Procedure A in messaging diagram 1300 may be the same as, or similar to, finishing 965 RRC Procedure A in messaging diagram 900. In some scenarios, the base station 104-1 may receive or detect 1331 the NAS message while receiving the first M segments from the UE 102. For example, the base station 104-1 may receive or detect 1331 the NAS message while the base station 104-1 receives the (M−L)-th segment, where 0<L<M. The base station 104-1 requires processing time to process the RRC PDU and/or as a result of interrupting RRC Procedure A. During the processing time, the base station 104-1 continues to sequentially receive the (M−L+1)-th through M-th segments from the UE 102.

Turning next to FIG. 14, in the messaging diagram 1400, the UE 102 (and possibly also the base station 104-1) starts 1425 RRC Procedure A, which includes the UE 102 transmitting the first M segments to the base station 104-1. Starting 1425 RRC Procedure A in messaging diagram 1400 may be the same as, or similar to, starting 925 RRC Procedure A in messaging diagram 900.

Next, the 5GC 110 transmits 1429 a NAS message to the base station 104-1, and the base station 104-1 detects 1431 the NAS message. For example, the intervening event may be viewed as the base station 104-1 receiving the NAS message transmitted 1429 by the 5GC 110, and the base station 104-1 may detect the intervening event (i.e., the detecting 931 of FIG. 9) by detecting 1431 the received NAS message.

In this example, the base station 104-1 suspends 1441 the NAS transmission/forwarding procedure (i.e., "RRC Procedure B" of FIG. 10) until after the base station 104-1 receives the remaining segments from the UE 102. Thus, the UE 102 (and possibly also the base station 104-1) finishes 1465 RRC Procedure A, which includes the UE 102 transmitting the last N−M segments to the base station 104-1. After completion of RRC Procedure A, the base station 104-1 transmits 1456 an RRC PDU containing the NAS message to the UE 102. Finishing 1465 RRC Procedure A and transmitting 1456 the RRC PDU in messaging diagram 1400 may be the same as, or similar to, finishing 1365 RRC Procedure A and transmitting 1356 the RRC PDU, respectively, in messaging diagram 1300, but in reverse order. The implementation of FIG. 14 may be particularly advantageous if the base station 104-1 cannot transmit a NAS message while receiving a segmented RRC message.

In any of the implementations and/or scenarios discussed above with reference to FIGS. 2 through 14, the base station 104-1 may indicate in RRC Message A whether the UE 102 is permitted to transmit a particular type of message (e.g., a measurement report message or an RRC PDU containing a NAS message) while the UE 102 is transmitting a segmented RRC message. If the RRC Message A indicates that the UE 102 is permitted to do so, the UE 102 may operate according to the messaging diagram of FIG. 2, 4 or 6. If the RRC Message A does not indicate that the UE 102 is permitted to do so, the UE 102 may instead operate according to the messaging diagram of FIG. 3, 5 or 7.

Also in any of the implementations and/or scenarios discussed above with reference to FIGS. 2 through 14, RRC Message A may include information (e.g., a field or information element) indicating that the UE 102 can (i.e., has permission to) transmit the UE capability information (e.g., UECapabilityInformation) in multiple segments. In these implementations, if RRC Message A does not include such in indicator, the UE 102 does not segment RRC Response Message A.

Also in any of the implementations and scenarios discussed above with reference to FIGS. 2 through 14, the base station 104-1 may utilize transaction identifiers to determine which RRC response messages (e.g., RRC Response Message A) transmitted by the UE 102 correspond to which RRC messages (e.g., RRC Message A) transmitted by the base station 104-1. In some implementations, for example, the base station 104-1 sets a transaction identifier to a first value, and includes that transaction identifier in the RRC Message A (e.g., in transmission 204 or 804, or in a similar transmission when starting 325, 425, 525, 625, 725, 925, 1025, 1125, 1225, 1325 or 1425 RRC Procedure A). In response, the UE 102 sets a transaction identifier to the first value, and includes that transaction identifier in the RRC Response Message A (e.g., in transmissions 222 or 822, or in similar transmissions when finishing 365, 465, 565, 665, 765, 965, 1065, 1165, 1265, 1365 or 1465 the RRC Procedure A). By inspecting this transaction identifier, the base station 104-1 can determine that the RRC Response Message A belongs to the same transaction as the RRC Message A. The UE 102 may include the transaction identifier in each segment of RRC Response Message A, for example. In such an implementation, the base station 104-1 may be unable to assemble RRC Response Message A segments if those segments include different transaction identifiers.

In some implementations, each segment of RRC Response Message A (or each segment of an RRC PDU including RRC Response Message A) includes a segment number indicating an order of that segment in a sequence. In such an implementation, the UE 102 may transmit segments of RRC Response Message A (or segments of an RRC PDU including RRC Response Message A) out of sequence. In the implementations discussed herein, it is understood that the number of a segment (e.g., first, M-th, N-th, etc.) merely refers to the time-order in which the user device transmits the segment, and not necessarily to any other ordering or sequencing of the segments. Additionally or alternatively, the UE 102 may include information in the last segment of RRC Response Message A (or the last segment of an RRC PDU including RRC Response Message A) to indicate that the segment is the last segment. The UE 102 may include the segment number and/or "last segment" information in RRC Response Message A by using a critical extensions field/ information element of the RRC Response Message A.

Alternatively or additionally, in some implementations, the UE 102 includes each segment of RRC Response Message A (or each segment of an RRC PDU including RRC Response Message A) in a new RRC message. In one such implementation, the new RRC message includes a segment number indicating an order of the segment in the sequence. In this implementation, the UE 102 may transmit segments of the RRC Response Message A (or segments of an RRC PDU including the RRC Response Message A) out of sequence. In another implementation, one of the new RRC messages includes the last segment of the RRC Response Message A (or the last segment of an RRC PDU including the RRC Response Message A), and also includes an indication that the new RRC message includes the last segment of the RRC Response Message A.

In other implementations, the UE 102 does not include the transaction identifier associated with the RRC Message A in any segment of the RRC Response Message A. For example, the UE 102 may include a different transaction identifier/value in RRC Response Message A or the segments thereof, or may not include any transaction identifier at all. In these implementations, the base station 104-1 may not know that the RRC Response Message A (or the segments thereof) and the RRC Message A belong to the same transaction until and unless the base station 104-1 assembles all of the segments into the complete RRC PDU, and subsequently obtains the RRC Response Message A from the RRC PDU.

Also in any of the implementations and/or scenarios discussed above with reference to FIGS. 2 through 14, the UE 102 may indicate to the base station 104-1 whether the UE 102 supports receiving and/or processing a particular RRC message (e.g., a reconfiguration message or an RRC PDU containing a NAS message) while the UE 102 is transmitting a segmented RRC message. If the UE 102 indicates that the UE 102 is permitted to do so, the base station 104-1 may operate according to the messaging diagram of FIG. 9, 11 or 13. If the UE 102 does not indicate that the UE 102 is permitted to do so, the UE 102 instead operates according to the messaging diagram of FIG. 10, 12 or 14.

Also in any of the implementations and/or scenarios discussed above with reference to FIGS. 2 through 14, the UE 102 may dynamically determine N (i.e., the number of segments to generate for a given RRC message) based on information included in the received RRC Message A. For example, the UE 102 may generate $N_1$ segments of the responsive RRC PDU in some cases (e.g., if connecting to a first network), but generate $N_2$ segments of the responsive RRC PDU in other cases (e.g., if connecting to a second, different network), where $N_1 \neq N_2$. If N is set based on the network, the networks may be associated with different areas and/or difference operators, for example. In other implementations, N is fixed (e.g., the UE 102 always generates the same number of segments of the RRC PDU when receiving RRC Message A).

Also in any of the implementations and/or scenarios of FIGS. 2 through 14, RRC Procedure A may be any suitable RRC procedure. For example, as noted above, RRC Procedure A may be a UE capability transfer procedure, with RRC Message A being a UECapabilityEnquiry message and RRC Response Message A being a UECapabilityInformation message. As another example, RRC Procedure A may be a UE information procedure, with RRC Message A being a UEInformationRequest message and RRC Response Message A being a UEInformationResponse message. In any of these implementations, the segmented RRC PDU that contains RRC Message A may be a UL-DCCH-MESSAGE. In other implementations, the segmented RRC PDU may be RRC Message A itself.

In implementations and/or scenarios where RRC Response Message A is a UECapabilityInformation message, the message may include UE capabilities in EUTRA, UE capabilities in NR, and/or UE capabilities in a multi-radio access technology (multi-RAT), dual connectivity (MR-DC) system. In these implementations, the UECapabilityEnquiry message may include an indication (e.g., "eutra") that the UE 102 is to provide EUTRA capability information. In response, the UE 102 includes a UE-EUTRA-Capability information element in the UECapabilityInformation message. Alternatively, or in addition, the UECapabilityEnquiry message may include an indication (e.g., "nr") that the UE 102 is to provide NR capability information. In response, the UE 102 includes a UE-NR-Capability information element in the UECapabilityInformation message. Alternatively, or in addition, the UECapabilityEnquiry message may include an indication (e.g., "eutra-nr") that the UE 102 is to provide MR-DC capability information. In response, the UE 102 includes a UE-MRDC-Capability information element in the UECapabilityInformation message. The UE-EUTRA-Capability information element, if included in the UECapabilityInformation message, may also include the partial or complete capabilities of the UE 102 in MR-DC.

Figure 15:
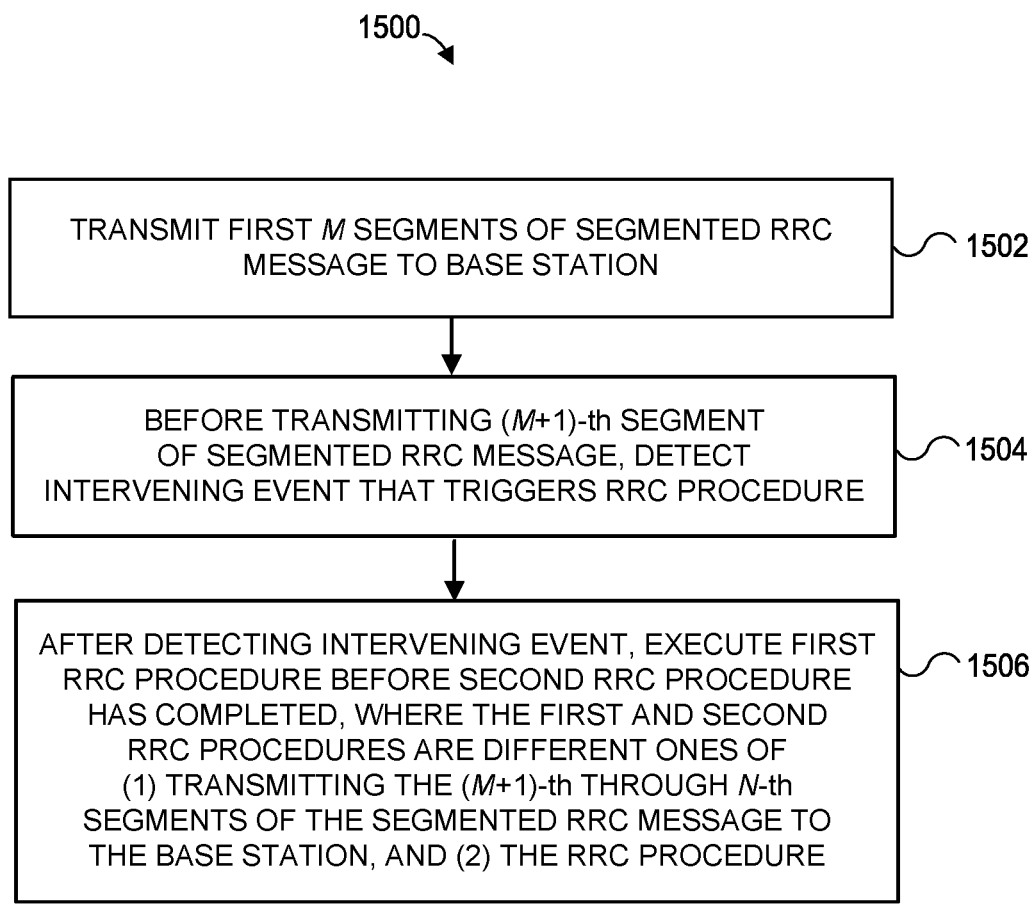
FIG. 15 is a flow diagram of an example method for managing communication of a segmented RRC message that includes N segments, according to a technique in which the user device detects the intervening event.

Referring now to FIG. 15, an example method 1500 for managing communication of a segmented RRC message can be implemented in a user device (e.g., by processing hardware 120 of the UE 102) configured to communicate with a base station (e.g., the base station 104-1). In the method 1500, the segmented RRC message includes N segments (e.g., within N respective segments of an RRC PDU), where N is an integer greater than one. The segmented RRC message may be a message indicating capabilities of the user device (e.g., a UECapabilityInformation message), for example.

At block 1502 of the method 1500, the user device transmits the first M segments of the segmented RRC message to the base station, where M is an integer greater than zero and less than N. As a more specific example, the transmission may include the segment transmissions 222-1 through 222-M of FIG. 2, or the segment transmissions included in the starting 325, 425, 525, 625 or 725 of RRC Procedure A in FIG. 3, 4, 5, 6 or 7, respectively.

At block 1504, before the user device transmits the (M+1)-th segment of the segmented RRC message, the user device detects an intervening event that triggers an RRC procedure. As a more specific example, the detection may include the detection 230, 330, 430, 530, 630 or 730 of FIG. 2, 3, 4, 5, 6 or 7, respectively. For instance, block 1504 may include detecting a NAS message (e.g., detecting, at an RRC layer of the user device, an IPL message that is received from the NAS layer and includes the NAS message) or determining that one or more criteria for sending a measurement report to the base station are satisfied, in which case the triggered RRC procedure may be transmission to the base station of the NAS message or a measurement report, respectively (e.g., in an RRC PDU).

At block 1506, after detecting the intervening event, the user device executes a first RRC procedure before a second RRC procedure has completed, where the "first" and "second" RRC procedures are different ones of (1) transmitting the (M+1)-th through the N-th segment of the segmented RRC message to the base station, and (2) the RRC procedure that was triggered by the intervening event. In some implementations, the triggered RRC procedure is an RRC procedure that includes the user device transmitting an RRC message to the base station. As a more specific example, the execution of the first RRC procedure may be the performing 250 of FIG. 2, the finishing 365, 565 or 765 of FIG. 3, 5 or 7, respectively, or the transmission 451 or 652 or FIG. 4 or 6, respectively. In some implementations and/or scenarios, block 1506 includes the user device suspending the second RRC procedure, such that the second RRC procedure is performed later than would normally be the case (i.e., later than if the first RRC procedure was not triggered or in progress). In other implementations and/or scenarios, block 1506 does not include any suspension. If the second RRC procedure is the transmission of the (M+1)-th through the N-th segment, for example, the user device may execute the first RRC procedure (e.g., transmit an RRC message) between the regularly scheduled segment transmissions.

In some implementations and/or scenarios, the method 1500 includes one or more additional blocks not shown in FIG. 15. For example, the method 1500 may include an additional block, occurring before block 1502, in which the user device receives an earlier RRC message from the base station (e.g., via the transmission 202 of FIG. 2), and the transmission at block 1502 may occur in response to that earlier RRC message. Further, in some implementations, the method 1500 may include a second additional block in which the user device, in response to receiving the earlier RRC message, sets the user device to a non-reporting state in which measurement reporting is disallowed irrespective of monitored PHY measurements. In such an implementation, if the second RRC procedure is a measurement reporting procedure, block 1506 may include the user device suspending transmission of a measurement report RRC message (to the base station) in response to the user device being in the non-reporting state.

Figure 16:
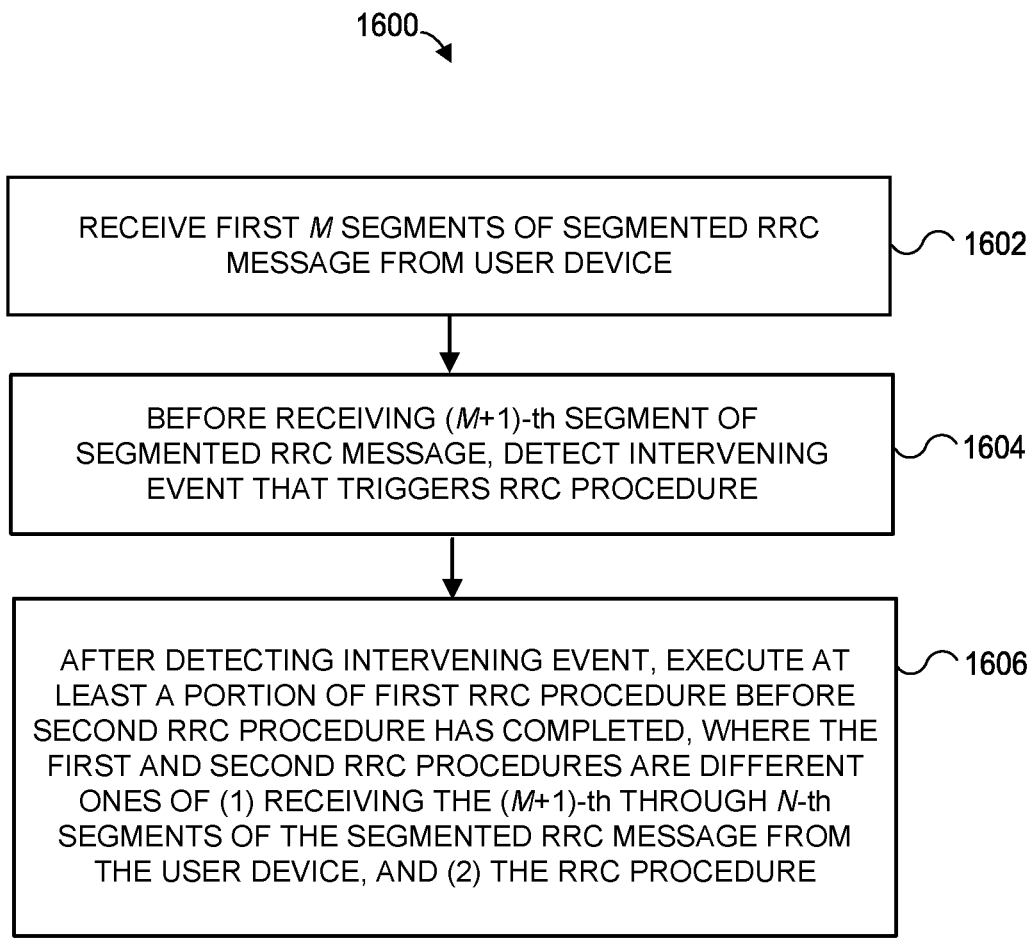
FIG. 16 is a flow diagram of an example method for managing communication of a segmented RRC message that includes N segments, according to a technique in which the base station detects the intervening event.

Referring now to FIG. 16, an example method 1600 for managing communication of a segmented RRC message can be implemented in a base station (e.g., by processing hardware 160 of the base station 104-1) configured to communicate with a user device (e.g., the UE 102). In the method 1600, the segmented RRC message includes N segments (e.g., within N respective segments of an RRC PDU), where N is an integer greater than one. The segmented RRC message may be a message indicating capabilities of the user device (e.g., a UECapabilityInformation message), for example.

At block 1602 of the method 1600, the base station receives the first M segments of the segmented RRC message from the user device, where M is an integer greater than zero and less than N. As a more specific example, the base station may receive the segments via the segment transmissions included in the starting 925, 1025, 1125, 1225, 1325 or 1425 of RRC Procedure A in FIG. 9, 10, 11, 12, 13 or 14, respectively.

At block 1604, before receiving the (M+1)-th segment of the segmented RRC message, the base station detects an intervening event that triggers an RRC procedure. As a more specific example, the detection may include the detection 931, 1031, 1131, 1231, 1331, or 1431 of FIG. 9, 10, 11, 12, 13 or 14, respectively. For instance, block 1604 may include detecting a NAS message (e.g., detecting, at an RRC layer of the user device, an IPL message that is received from the NAS layer and includes the NAS message) or determining that one or more criteria for reconfiguring the user device are satisfied, in which case the triggered RRC procedure may be transmission to the user device of the NAS message (e.g., in an RRC PDU) or a user device reconfiguration procedure, respectively.

At block 1606, after detecting the intervening event, the base station executes at least a portion of a first RRC procedure before a second RRC procedure has completed, where the "first" and "second" RRC procedures are different ones of (1) receiving the (M+1)-th through the N-th segment of the segmented RRC message from the user device, and (2) the RRC procedure that was triggered by the intervening event. As a more specific example, executing at least the portion of the first RRC procedure may include performing 951 the RRC Procedure B in FIG. 9, finishing 1065 the RRC Procedure A in FIG. 10, transmitting 1154 the RRCReconfiguration message in FIG. 11, finishing 1265 the RRC Procedure A in FIG. 12, transmitting 1356 the NAS message in FIG. 13, or finishing 1465 the RRC Procedure A in FIG. 14.

Figure 17:
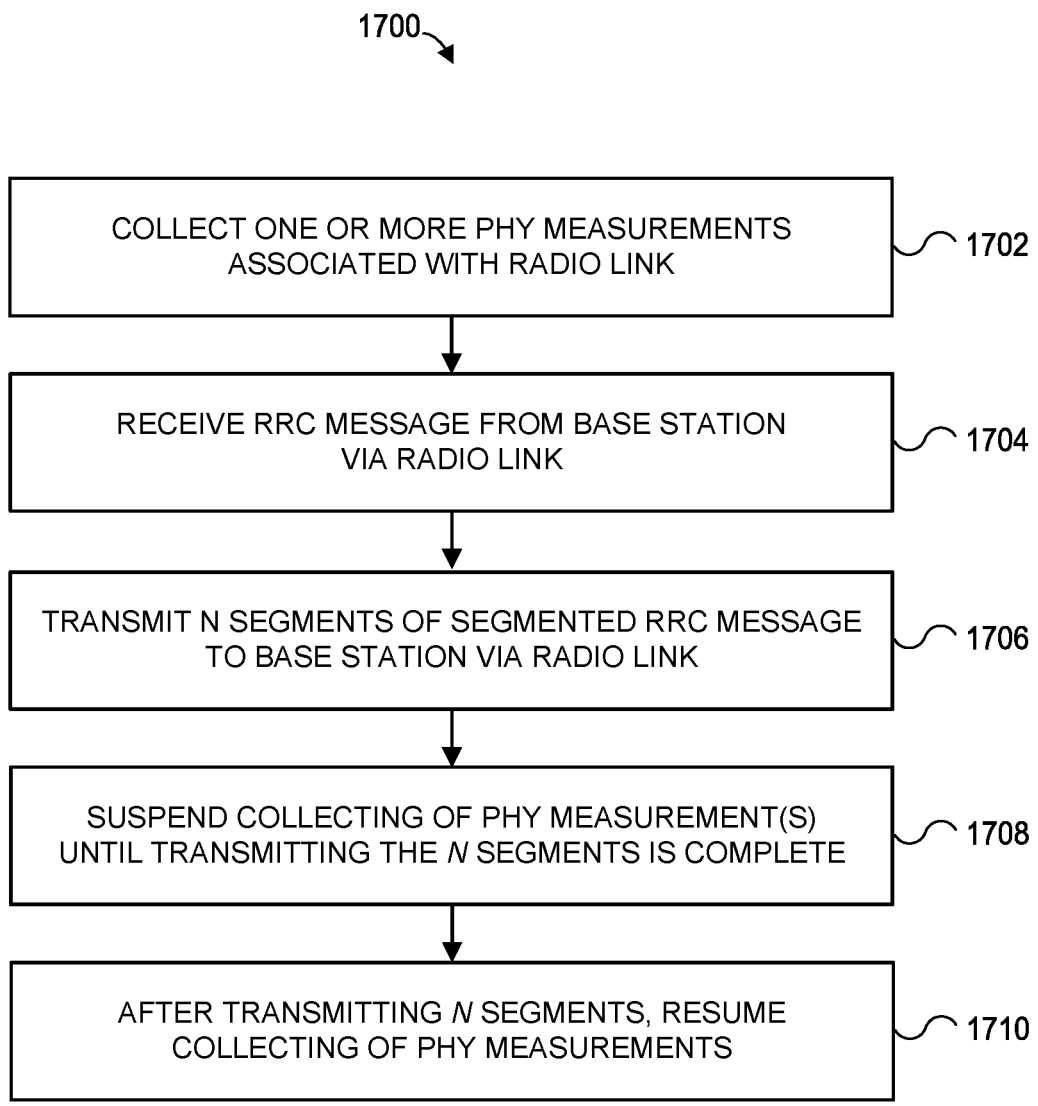
FIG. 17 is a flow diagram of an example method for managing communication of a segmented RRC message that includes N segments, according to a technique in which the user device suspends collection of PHY measurements prior to transmitting any segments of the segmented RRC message.

Referring now to FIG. 17, an example method 1700 for managing communication of a segmented RRC message can be implemented in a user device (e.g., by processing hardware 120 of the UE 102) configured to communicate with a base station (e.g., the base station 104-1) via a radio link. In the method 1700, the segmented RRC message includes N segments (e.g., within N respective segments of an RRC PDU), where N is an integer greater than one. The segmented RRC message may be a message indicating capabilities of the user device (e.g., a UECapabilityInformation message), for example.

At block 1702, the user device collects one or more PHY measurements associated with the one or more beams or carrier frequencies. For example, the user device may receive reference signals (e.g., SSB or CSI-RS) from the base station and/or another base station on known location and time-frequency resources, and process those reference signals to derive the PHY measurements. The user device may also filter the PHY measurements, e.g., to achieve some averaging or smoothing over time. The user device may generally use the PHY measurements to determine whether to send a measurement report to the base station. For example, the user device may send a measurement report to the base station if one or more PHY measurements or measurement results (e.g., after filtering) satisfy (exceed or fall below) a predetermined threshold.

At block 1704, the user device receives an RRC message (e.g., a UECapabilityEnquiry message) from the base station via the radio link. As a more specific example, the user device may receive the RRC message via the transmission 804 of FIG. 8.

At block 1706, and in response to receiving the RRC message at block 1704, the user device sequentially transmits the N segments of the segmented RRC message to the base station via the radio link. As a more specific example, the transmission may include the transmissions 822-1 through 822-N of FIG. 8.

At block 1708, and also in response to receiving the RRC message at block 1704, the user device suspends the collecting of the PHY measurement(s) until transmitting the N segments is complete. That is, the user device does not collect the PHY measurement(s) while performing block 1706. As a more specific example, the suspension may be the suspension 820 of FIG. 8.

At block 1710, after transmitting the N segments at block 1706, the user device resumes the collecting of the PHY measurement(s) that the user device had suspended at block 1708.

By way of example, and not limitation, the disclosure herein contemplates at least the following aspects:

Aspect 1—A method, in a user device configured to communicate with a base station, for managing communication of a segmented radio resource control (RRC) message that includes N segments, the method comprising: transmitting a first M segments of the segmented RRC message to the base station, M being an integer greater than zero and less than N; detecting, by processing hardware of the user device and before transmitting an (M+1)-th segment of the segmented RRC message, an intervening event that triggers an RRC procedure; and after detecting the intervening event, executing a first RRC procedure before a second RRC procedure has completed, wherein the first RRC procedure and the second RRC procedure are different ones of (i) transmitting the (M+1)-th segment through an N-th segment of the segmented RRC message to the base station, and (ii) the RRC procedure.

Aspect 2—The method of aspect 1, wherein executing the first RRC procedure before the second RRC procedure has completed includes executing the RRC procedure before transmitting the (M+1)-th segment through the N-th segment to the base station.

Aspect 3—The method of aspect 1, wherein executing the first RRC procedure before the second RRC procedure has completed includes suspending the RRC procedure until after transmitting the (M+1)-th segment through the N-th segment to the base station.

Aspect 4—The method of aspect 3, wherein detecting the intervening event includes detecting an event that triggers transmission of an RRC message.

Aspect 5—The method of aspect 1, wherein: detecting the intervening event includes determining that one or more physical layer (PHY) measurements satisfy one or more criteria for sending a measurement report to the base station; the RRC procedure is a transmission to the base station of an RRC message that includes the measurement report; and the method further comprises transmitting the RRC message that includes the measurement report to the base station.

Aspect 6—The method of aspect 5, comprising transmitting the (M+1)-th segment through the N-th segment after transmitting the RRC message that includes the measurement report.

Aspect 7—The method of aspect 5, comprising transmitting the RRC message that includes the measurement report after transmission of the (M+1)-th segment through the N-th segment.

Aspect 8—The method of aspect 7, further comprising: before transmitting the first M segments, receiving an earlier RRC message from the base station; and in response to receiving the earlier RRC message, setting, by the processing hardware, the user device to a non-reporting state in which measurement reporting is disallowed irrespective of monitored PHY measurements, wherein suspending transmission of the RRC message that includes the measurement report until after transmission of the (M+1)-th segment through the N-th segment is in response to the user device being in the non-reporting state.

Aspect 9—The method of aspect 1, wherein: detecting the intervening event includes determining that a non-access stratum (NAS) message is ready for transmission to the base station; the RRC procedure is a transmission to the base station of one or more RRC messages that include the NAS message; and the method further comprises transmitting the one or more RRC messages to the base station.

Aspect 10—The method of aspect 9, wherein transmitting the one or more RRC messages to the base station occurs before transmitting the (M+1)-th segment through the N-th segment to the base station.

Aspect 11—The method of aspect 9, wherein transmitting the (M+1)-th segment through the N-th segment to the base station occurs before transmitting the one or more RRC message to the base station.

Aspect 12—The method of aspect 1, further comprising: receiving an RRC message from the base station, wherein transmitting the first M segments is in response to receiving the RRC message.

Aspect 13—The method of aspect 11, wherein: the RRC message is a message requesting user device capability information; and the segmented RRC message is a message indicating capabilities of the user device.

Aspect 14—The method of aspect 1, wherein the segmented RRC message is included in a segmented RRC protocol data unit (PDU).

Aspect 15—A user device comprising processing hardware configured to execute a method according to any one of aspects 1 through 14.

Aspect 16—A method, in a base station configured to communicate with a user device, for managing communication of a segmented radio resource control (RRC) message that includes N segments, the method comprising: receiving a first M segments of the segmented RRC message from the user device, M being an integer greater than zero and less than N; detecting, by processing hardware of the base station and before receiving an (M+1)-th segment of the segmented RRC message, an intervening event that triggers an RRC procedure; and after detecting the intervening event, executing at least a portion of a first RRC procedure before a second RRC procedure has completed, wherein the first RRC procedure and the second RRC procedure are different ones of (i) receiving the (M+1)-th segment through an N-th segment of the segmented RRC message from the user device, and (ii) the RRC procedure.

Aspect 17—The method of aspect 16, wherein executing at least the portion of the first RRC procedure before the second RRC procedure has completed includes executing the RRC procedure after receiving the (M+1)-th segment through the N-th segment from the user device.

Aspect 18—The method of aspect 17, wherein executing at least the portion of the first RRC procedure before the second RRC procedure has completed includes executing at least the portion of the RRC procedure before receiving the (M+1)-th segment through the N-th segment from the user device.

Aspect 19—The method of aspect 16, wherein detecting the intervening event includes determining that one or more criteria for triggering reconfiguration of the user device are satisfied.

Aspect 20—The method of aspect 19, wherein executing at least the portion of the first RRC procedure before the second RRC procedure has completed includes transmitting an RRC reconfiguration message to the user device before receiving the (M+1)-th segment through the N-th segment from the user device.

Aspect 21—The method of aspect 20, wherein executing at least the portion of the first RRC procedure before the second RRC procedure has completed further includes receiving an RRC reconfiguration complete message from the user device after receiving the (M+1)-th segment from the user device, but before receiving the (M+2)-th segment through the N-th segment from the user device.

Aspect 22—The method of aspect 19, wherein executing at least the portion of the first RRC procedure before the second RRC procedure has completed includes transmitting an RRC reconfiguration message to the user device after receiving the (M+1)-th segment through the N-th segment to from the user device.

Aspect 23—The method of aspect 16, wherein detecting the intervening event includes determining that a non-access stratum (NAS) message is ready to be transmitted to the user device.

Aspect 24—The method of aspect 23, wherein determining that the NAS message is ready to be transmitted includes receiving the NAS message from a core network node.

Aspect 25—The method of aspect 23, wherein executing at least the portion of the first RRC procedure before the second RRC procedure has completed includes transmitting one or more RRC protocol data units (PDUs) that contain the NAS message to the user device before receiving the (M+1)-th segment through the N-th segment from the user device.

Aspect 26—The method of aspect 23, wherein executing at least the portion of the first RRC procedure before the second RRC procedure has completed includes transmitting one or more RRC protocol data units (PDUs) that contain the NAS message to the user device after receiving the (M+1)-th segment through the N-th segment from the user device.

Aspect 27—The method of aspect 16, wherein the segmented RRC message is a message indicating capabilities of the user device.

Aspect 28—The method of aspect 16, wherein the segmented RRC message is included in a segmented RRC protocol data unit (PDU).

Aspect 29—A base station comprising processing hardware configured to execute a method according to any of one of aspects 16 through 28.

Aspect 30—A method, in a user device configured to communicate with a base station via a radio link, for managing communication of a segmented radio resource control (RRC) message that includes N segments, the method comprising: collecting one or more physical layer (PHY) measurements associated with the radio link; receiving an RRC message from the base station via the radio link; in response to receiving the RRC message, transmitting the N segments of the segmented RRC message to the base station via the radio link, and suspending the collecting of the PHY measurements until transmitting the N segments is complete; and after transmitting the N segments, resuming the collecting of the PHY measurements.

Aspect 31—The method of aspect 30, further comprising, while collecting the PHY measurements: determining whether the PHY measurements satisfy one or more criteria; and when the PHY measurements satisfy the one or more criteria, transmitting a measurement report to the base station.

Aspect 32—The method of aspect 30, wherein collecting the PHY measurements includes processing one or more reference signals received from the base station to generate one or more of: an error rate associated with the radio link; a signal-to-noise ratio associated with the radio link; or a signal-to-noise-and-interference ratio associated with the radio link.

Aspect 33—The method of aspect 30, wherein: the RRC message is a message requesting user device capability information; and the segmented RRC message is a message indicating capabilities of the user device.

Aspect 34—The method of aspect 30, wherein the segmented RRC message is included in a segmented RRC protocol data unit (PDU).

Aspect 35—A user device comprising processing hardware configured to execute a method according to any one of aspects 30 through 34.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain implementations are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate, through the principles disclosed herein, still additional alternative structural and functional designs for managing the communication of segmented RRC messages. Thus, while particular implementations and applications have been illustrated and described, it is to be understood that the disclosed implementations are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method, in a base station configured to communicate with a user device, for managing communication of a segmented radio resource control (RRC) message that includes N segments, the method comprising:
receiving a first M segments of the segmented RRC message from the user device, M being an integer greater than zero and less than N;
detecting, before receiving an (M+1)-th segment of the segmented RRC message, an intervening event that triggers an RRC procedure; and
after detecting the intervening event, (i) receiving the (M+1)-th segment through an N-th segment of the segmented RRC message from the user device, and (ii) suspending the RRC procedure until after the base station receives the N-th segment.

2. The method of claim 1, wherein detecting the intervening event includes determining that one or more criteria for triggering reconfiguration of the user device are satisfied.

3. The method of claim 1, further comprising:
transmitting an RRC reconfiguration message to the user device after receiving the (M+1)-th segment through the N-th segment from the user device.

4. The method of claim 1, wherein detecting the intervening event includes determining that a non-access stratum (NAS) message is ready to be transmitted to the user device.

5. The method of claim 1, wherein receiving the first M segments includes, for each segment of the first M segments, receiving a message including the segment and a segment number indicating an order of the segment in the segmented RRC message.

6. The method of claim 1, wherein:
receiving the N-th segment includes receiving a message including the N-th segment and an indication that the message includes a last segment of the segmented RRC message.

7. A method, in a user device configured to communicate with a base station via a radio link, for managing communication of a segmented radio resource control (RRC) message that includes N segments, the method comprising:
collecting one or more physical layer (PHY) measurements associated with the radio link;
receiving an RRC message from the base station via the radio link;
in response to receiving the RRC message,
transmitting the N segments of the segmented RRC message to the base station via the radio link, and
suspending the collecting of the PHY measurements until transmitting the N segments is complete; and
after transmitting the N segments, resuming the collecting of the PHY measurements.

8. The method of claim 7, wherein collecting the PHY measurements includes processing one or more reference signals received from the base station to generate one or more of:
an error rate associated with the radio link;
a signal-to-noise ratio associated with the radio link; or
a signal-to-noise-and-interference ratio associated with the radio link.

9. The method of claim 7, wherein transmitting the N segments includes:
for each segment of at least a first N−1 segments of the N segments, transmitting a message including the segment and a segment number indicating an order of the segment in the segmented RRC message; and
for an N-th segment of the N segments, transmitting a message including the N-th segment and an indication that the message includes a last segment of the segmented RRC message.

10. A base station comprising processing hardware and configured to:
receive a first M segments of a segmented radio resource control (RRC) message from a user device, the segmented RRC message including N segments, and M being an integer greater than zero and less than N;
detect, before receiving an (M+1)-th segment of the segmented RRC message, an intervening event that triggers an RRC procedure; and
after detecting the intervening event, (i) receive the (M+1)-th segment through an N-th segment of the segmented RRC message from the user device, and (ii) suspend the RRC procedure until after the base station receives the N-th segment.

11. The base station of claim 10, wherein detecting the intervening event includes determining that one or more criteria for triggering reconfiguration of the user device are satisfied.

12. The base station of claim 10, wherein the base station is further configured to:
transmit an RRC reconfiguration message to the user device after receiving the (M+1)-th segment through the N-th segment from the user device.

13. The base station of claim 10, wherein detecting the intervening event includes determining that a non-access stratum (NAS) message is ready to be transmitted to the user device.

14. The base station of claim 10, wherein receiving the first M segments includes, for each segment of the first M segments, receiving a message including the segment and a segment number indicating an order of the segment in the segmented RRC message.

15. The base station of claim 10, wherein:
receiving the N-th segment includes receiving a message including the N-th segment and an indication that the message includes a last segment of the segmented RRC message.

16. A user device comprising processing hardware and configured to:
collect one or more physical layer (PHY) measurements associated with a radio link;
receive a radio resource control (RRC) message from a base station via the radio link;
in response to receiving the RRC message,
transmit N segments of a segmented RRC message to the base station via the radio link, and
suspend the collecting of the PHY measurements until transmitting the N segments is complete; and
after transmitting the N segments, resume the collecting of the PHY measurements.

17. The user device of claim 16, wherein collecting the PHY measurements includes processing one or more reference signals received from the base station to generate one or more of:
an error rate associated with the radio link;
a signal-to-noise ratio associated with the radio link; or
a signal-to-noise-and-interference ratio associated with the radio link.

18. The user device of claim 16, wherein transmitting the N segments includes:
for each segment of at least a first N−1 segments of the N segments, transmitting a message including the segment and a segment number indicating an order of the segment in the segmented RRC message; and
for an N-th segment of the N segments, transmitting a message including the N-th segment and an indication that the message includes a last segment of the segmented RRC message.

* * * * *